(12) United States Patent  (10) Patent No.: US 7,064,666 B2
Sasaki et al.  (45) Date of Patent: Jun. 20, 2006

(54) COMPOSITE SENSOR FOR DOOR

(75) Inventors: Shigeaki Sasaki, Hyogo-ken (JP);
Kenji Nishigaki, Hyogo-ken (JP);
Yasutaka Kanda, Hyogo-ken (JP)

(73) Assignee: Nabco Limited, Hyogo-Ken (JP)

( * ) Notice: Subject to any disclaimer, the term of this patent is extended or adjusted under 35 U.S.C. 154(b) by 156 days.

(21) Appl. No.: 10/773,082

(22) Filed: Feb. 5, 2004

(65) Prior Publication Data

US 2004/0160318 A1 Aug. 19, 2004

(30) Foreign Application Priority Data

Feb. 6, 2003 (JP) ............................. 2003-029343
May 19, 2003 (JP) ............................. 2003-140719

(51) Int. Cl.
*G08B 13/08* (2006.01)

(52) U.S. Cl. .................... 340/545.3; 340/522; 340/523; 340/555; 250/221

(58) Field of Classification Search ............. 340/545.3, 340/521–523, 552–557; 250/208.4, 22; 49/25, 49/26–28, 31, 49; 318/452–455, 466, 480, 318/489
See application file for complete search history.

(56) References Cited

U.S. PATENT DOCUMENTS

| 3,852,592 | A | * | 12/1974 | Scoville et al. ............. 250/221 |
| 4,317,117 | A | * | 2/1982 | Chasek ........................ 342/53 |
| 4,577,437 | A | * | 3/1986 | Gionet et al. .................. 49/25 |
| 4,967,083 | A | * | 10/1990 | Kornbrekke et al. ..... 250/341.7 |
| 5,142,152 | A | * | 8/1992 | Boiucaner ................ 250/341.7 |
| 5,914,655 | A | * | 6/1999 | Clifton et al. .............. 340/506 |

OTHER PUBLICATIONS

BEA Sensors, Activ8 Three On User's Manual, Sep. 28, 2002, www.beasensors.com.*
BEA Sensors, Activ8 Three Technical Specification, Sep. 28, 2002, www.beasensors.com.*
B.E.A. ACTIV8 .3 motion sensor, product information, 2 pages.

* cited by examiner

*Primary Examiner*—Daniel Wu
*Assistant Examiner*—Travis Hunnings
(74) *Attorney, Agent, or Firm*—Duane Morris LLP

(57) ABSTRACT

A radio-wave transmitter-receiver section (12) forms a radio-wave detection zone (16) for detecting an object at a location way from a door (4). A light emitter-receiver section (20) forms an optical detection zone (42) for detecting an object at a location along and closer to the door (4). The light emitter-receiver section (20) includes mirrors (28, 36) which are used to increase or decrease the depth dimension of the optical detection zone (42) in the direction perpendicular to the door (4).

8 Claims, 23 Drawing Sheets

Fig. 3A
Fig. 3B
Fig. 3C
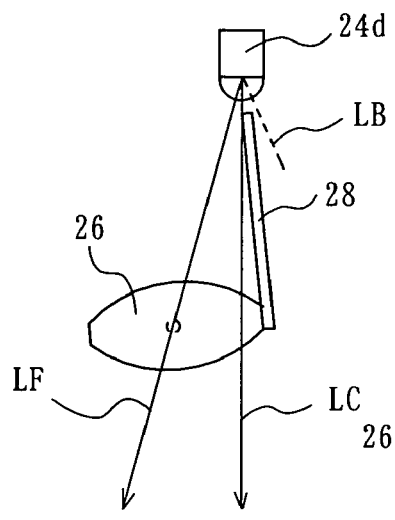
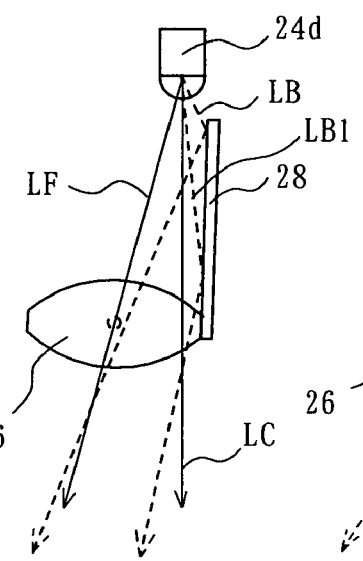
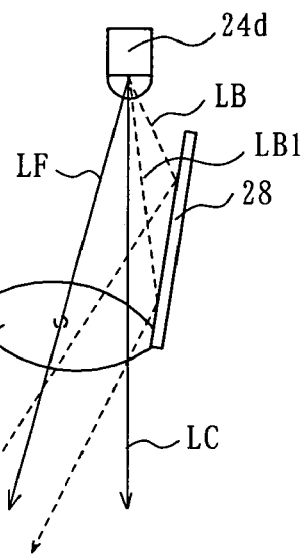
Fig. 4
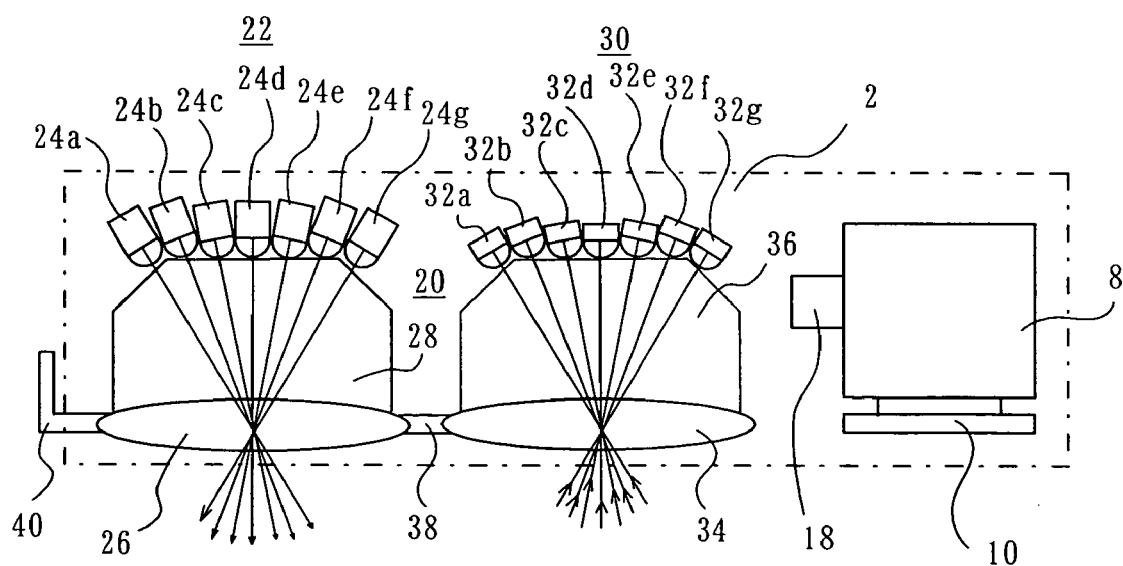

COMPOSITE SENSOR FOR DOOR

The present invention relates to a door sensor which detects an object in the vicinity of, for example, an automatic door, and more particularly to a composite door sensor including sensors for detecting an object by means of radio waves and light.

BACKGROUND OF THE INVENTION

An example of such composite door sensor is disclosed in a catalog of B.E.A. Inc., entitled "ACTIV8.3", retrieved through the Internet at the B.E.A. Inc. website on Jan. 29, 2003.

The composite sensor disclosed in this catalog includes a microwave transmitter-receiver section and an infrared (IR) emitter-receiver section in a single casing. A microwave is used to detect a moving object, e.g. pedestrian, moving toward a door. When a pedestrian is detected by the microwave transmitter-receiver section, the door is opened. IR light is used to detect an object, e.g. a pedestrian, standing stationary in the vicinity of the door. When the pedestrian is detected by the IR emitter-receiver section, the door is kept open. The composite sensor is so arranged that an antenna for use in the microwave transmitter-receiver section can be adjusted in its angle with respect to the surface of the door within an angular range between 15 degrees and 50 degrees. The adjustment of the antenna angle can move the detection zone of the microwave transmitter-receiver section in the depth direction of the door, i.e. along the direction perpendicular to the door. In contrast, the detection zone of the IR emitter-receiver section cannot be moved in the depth direction of the door.

As described above, the microwave transmitter-receiver section is used to detect a moving pedestrian and activate the door. It may sometimes be desired to detect a pedestrian and activate the door to open when the pedestrian is at a relatively distant location from the door. For that purpose, the antenna may be installed with a large angle relative to the door surface so that the pedestrian can be detected at a location remote in the depth direction from the door. While the antenna angle can be set to such a larger angle, the detection zone of the IR emitter-receiver section cannot be moved in the depth direction of the door, which results in a large non-detection zone formed between the detection zone of the microwave transmitter-receiver section and the detection zone of the IR emitter-receiver section, where objects can be detected neither by the microwave transmitter-receiver section nor by the IR emitter-receiver section. If a pedestrian stands still in this non-detection zone he or she can be detected neither by the microwave transmitter-receiver section nor by the IR emitter-receiver section. The detection zone of the IR emitter-receiver section may be moved closer to the detection of the microwave transmitter-receiver section by appropriately modifying the installation of the IR emitter-receiver section. In such case, however, a pedestrian standing still in the vicinity of the door cannot be detected, and, therefore, an additional sensor may have to be used to detect pedestrians present close to the door.

IR light, which is used in composite door sensors of the above-described type is subject to influence of external disturbances, such as rain and snow. In other words, IR light can be reflected by raindrops and snowflakes as well as human bodies. Accordingly, a conventional composite door sensor using IR light may detect raindrops or snowflakes as if they were a human body, and may cause a door to open although no object is present in the vicinity of the door.

Therefore, an object of the present invention is to provide a composite sensor with a gap between a detection zone of a radio-wave sensor and a detection zone of an optical sensor which can be made small. Another object of the present invention is to provide a composite sensor for automatic doors with reduced occurrences of erroneous operation of the door which could be caused by external disturbances, such as rain and snow.

SUMMARY OF THE INVENTION

A composite sensor for a door according to a first embodiment of the present invention includes a radio-wave transmitter-receiver section and a light emitter-receiver section. The radio-wave transmitter-receiver section produces a radio-wave detection zone at a position relatively remote from the door for detecting an object in it. The radio-wave transmitter-receiver section includes a radio-wave transmitter adapted to send a radio wave toward the radio-wave detection zone, and a radio-wave receiver adapted to receive a radio wave as reflected from the radio-wave detection zone. The radio-wave transmitter-receiver section may be arranged such that its angle relative to a reference plane, e.g. the surface of the door, can be adjustable. The light emitter-receiver section produces an optical detection zone at a position near and along the door for detecting an object in it. The light emitter-receiver section includes a light emitter adapted to emit light toward the optical detection zone and a light receiver adapted to receive light as reflected from the optical detection zone. The light emitter-receiver section has optical detection zone modifying means which can increase or decrease the dimension of the optical detection zone in the depth direction relative to the door, i.e. along a line perpendicular to the door surface.

The optical detection zone modifying means may include reflecting means which operates to reflect the emitted light from the light emitter-receiver section, and light collecting means which operates to collect the light to be received. The reflecting means and collecting means operate together to enlarge or reduce the optical detection zone. It is desirable for the reflecting means and the light collecting means to have their angles relative to a predetermined plane varied in synchronization with each other.

A composite sensor for doors according to a second embodiment of the present invention produces a first detection zone at a location relatively remote from the door for detecting an object therein by means of a radio wave, and a second detection zone along and near the door for detecting an object therein by means of light. The composite sensor also includes invalidating means which nullifies the result of detection in the second detection zone when the door is in its closed position. With this arrangement, if raindrops or snowflakes are detected erroneously as a pedestrian in the second detection zone when the door is in the closed position, the detection result from the second detection zone is not reflected in the overall detection result of the composite sensor.

A composite sensor for doors according to a third embodiment of the present invention produces first and second detection zones, which are similar to those of the sensor of the second embodiment. The composite sensor also includes validating means which makes the result of detection in the second detection zone valid when an object is detected in the first detection zone. Being triggered by the result of detection in the first detection zone formed by a radio wave which is hardly affected by external disturbances, such as rain and snow, relative to light, the result of detection in the second detection zone is validated or invalidated. More specifically, only when a pedestrian is detected in the first detection zone, the validating means validates the result of detection in the second detection zone. With this arrangement, even when raindrops or snowflakes are detected erroneously as a pedestrian in the second detection zone, the result of detection in the second detection zone is not reflected in the overall detection result of the composite sensor unless a pedestrian is present in the first detection zone.

The validating means may be so arranged as to validate the result of detection in the second detection zone only when a pedestrian is continuously detected in the first detection zone for a first time period. Thus, the result of detection in the second detection zone is validated and reflected in the overall detection result of the sensor only when not only a pedestrian is detected in the first detection zone but also such detection continues for the first period.

The validating means may be so arranged as to validate the result of detection in the second detection zone only for a second time period when a pedestrian is detected in the first detection zone. By limiting the time period in which the result of detection in the second detection zone is validated and used, unnecessary validation of the result of detection in the second detection zone can be avoided.

A composite sensor for doors according to a fourth embodiment of the present invention produces first and second detection zones, which are similar to those of the sensor of the second embodiment. The composite sensor also includes validating means which validates the result of detection in the second detection zone when an object is continuously detected in the second detection zone for a third time period.

A composite sensor for doors according to a fifth embodiment of the present invention produces first and second detection zones, which are similar to those of the sensor of the second embodiment. The composite sensor also includes invalidating means which invalidates the result of detection in the second detection zone when environmental conditions around the door tend to affect the result of detection. Like this, depending on environmental conditions around the door, the result of detection in the second detection zone is validated or invalidated. An environmental condition which may affect the detection result is rainfall or snowfall, for example. Whether or not rain or snow is falling can be indirectly detected based on, for example, temperature and humidity. For that purpose, reference values of humidity at different temperatures, based on which occurrence of rainfall or snowfall can be judged, are set beforehand, and a current humidity is compared with the humidity reference value at a current temperature to see whether it is above or below the reference value and judge if rain or snow is falling. Alternatively, rainfall or snowfall may be detected by seeing if drops of water or puddles are on the floor or ground.

BRIEF DESCRIPTION OF THE DRAWINGS

FIGS. 3A, 3B and 3C show a light-emitting device and a mirror disposed in different positional relationships in the sensor shown in FIG. 1.

FIG. 4 schematically shows an arrangement of the composite sensor shown in FIG. 1.

DESCRIPTION OF EMBODIMENTS

Figure 1:
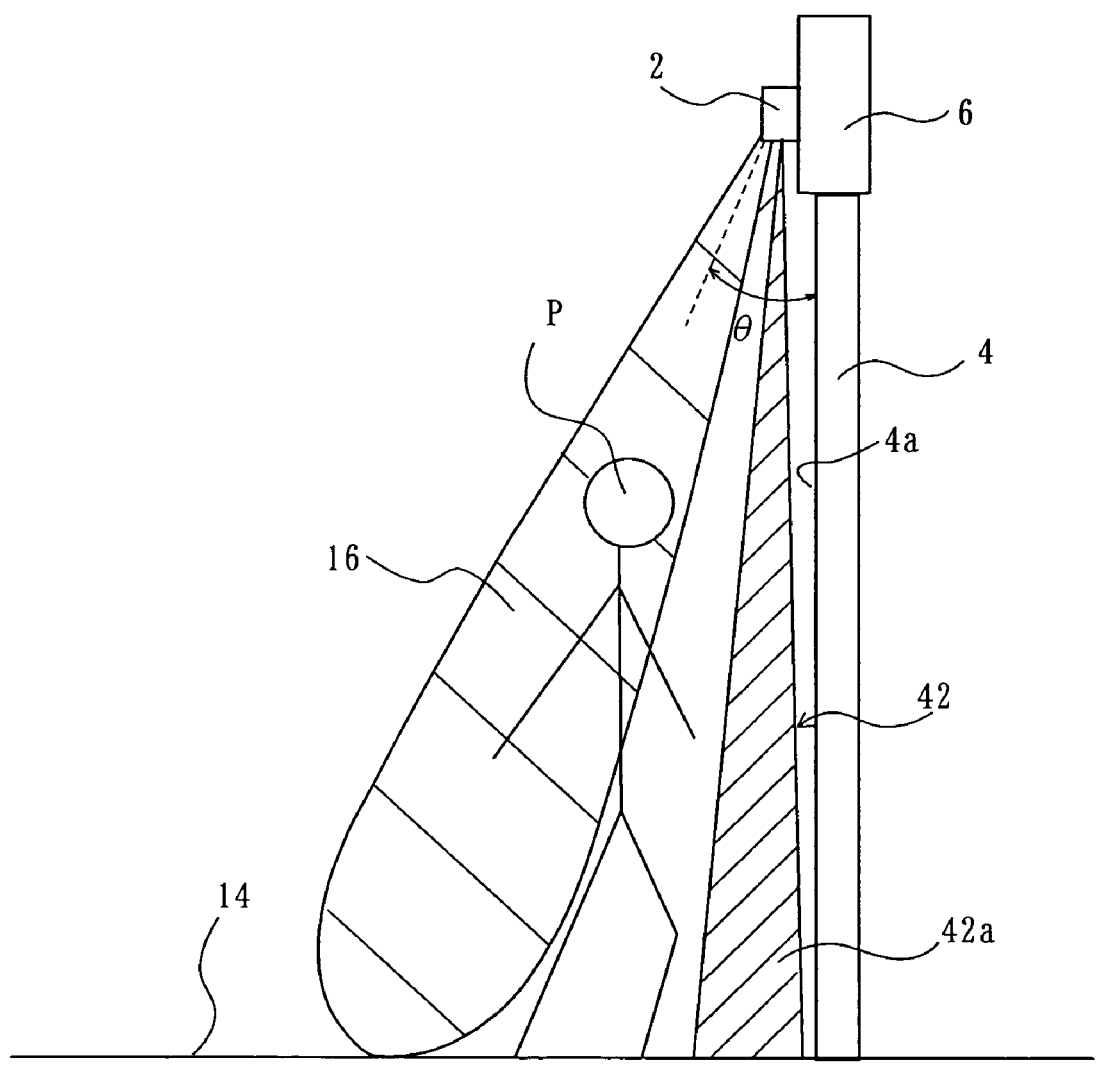
FIG. 1 is a side view showing a composite sensor for doors according to a first embodiment of the present invention, with the angle of a radio-wave detection zone with respect to the door surface set to a small value, and with the size of an optical detection zone reduced to the largest degree.
Figure 2:
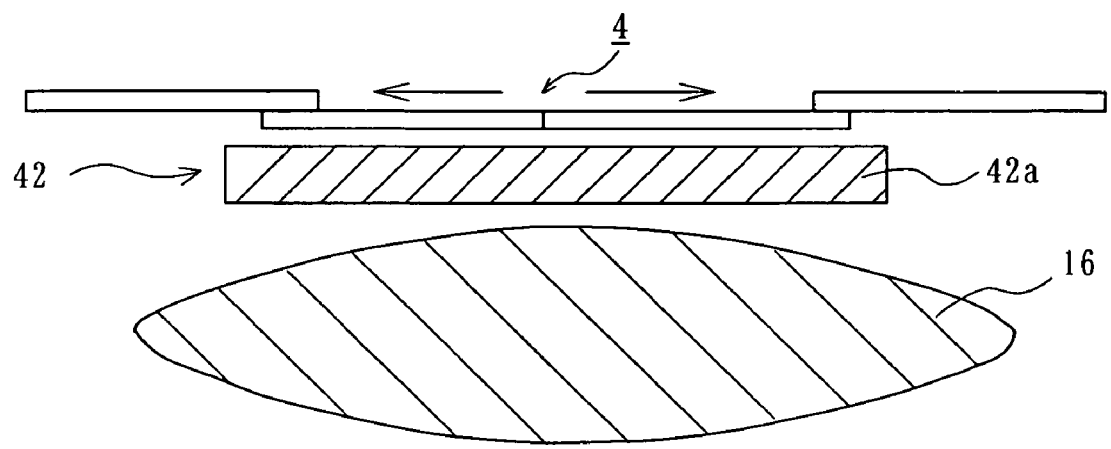
FIG. 2 is a plan view of the arrangement shown in FIG. 1.

As shown in FIG. 1, a composite sensor 2 according to a first embodiment of the present invention is installed on a lintel 6 above an automatic door 4. The door 4 shown in FIG. 1 is a double sliding door as shown in FIG. 2, which includes two door panels pulled open and closed away from and toward each other.

As shown in FIG. 4, the composite sensor 2 has a radio-wave transmitting-receiving module 8, in which a radio-wave transmitter-receiver section 12 (FIG. 5) is housed. The radio-wave transmitter-receiver section 12 transmits a radio wave, e.g. a microwave, from an antenna 10 and receives a reflected microwave to detect a moving object, e.g. a pedestrian. The module 8 is disposed to send and receive a radio wave toward and from a floor 14 as shown in FIG. 1. The transmission and reception of the radio wave produces a radio-wave detection zone 16 extending from the module 8 to the floor 14. The shape of the radio-wave detection zone 16 is dependent on the directivity pattern of the antenna 10, and its width dimension is larger than the width of the door 4, as shown in FIG. 2. The radio-wave transmitter-receiver section 12 detects a moving article in the radio-wave detection zone 16, e.g. a pedestrian moving toward the door 4. Upon detection of the moving object, e.g. a pedestrian, by the radio-wave transmitter-receiver section 12, the door 4 is opened. The radio-wave detection zone 16 is an activation zone for opening the door 4.

As shown in FIG. 4, angle adjusting means, e.g. an angle adjusting shaft 18, extends from a side of the radio-wave transmitting-receiving module 8 in parallel with a surface 4a of the door 4. The angle θ (FIG. 1) between the direction of the largest field strength of the antenna 10 (i.e. the center line of the radio-wave detection zone 16) and a reference surface, e.g. the door surface 4a, can be adjusted by rotating the angle adjusting shaft 18.

A light emitter-receiver section 20 is disposed beside the radio-wave transmitting-receiving module 8, as shown in FIG. 4. The light emitter-receiver section 20 includes a light emitter 22 for emitting light beams toward the floor 14. The light emitter 22 includes a plurality of, seven, for example, light emitting devices 24a through 24g, each of which emits a light beam, e.g. an infrared beam, from a respective front surface over a predetermined light-emitting angular range. The front surfaces of the respective light emitting devices 24a–24g are directed toward the floor 14. Refracting means, e.g. a convex lens 26, is disposed in such a manner that a predetermined portion of the light beam emitted by each of the light emitting devices 24a–24g can pass through the center of the lens 26 and that the beam portions passing through the center of the lens 26 can cross each other. The convex lens 26 may be a double convex lens. As shown in FIGS. 3A, 3B and 3C, one reflecting means, e.g. a planar mirror 28, is fixed to rear end portion of the lens 26, i.e. the side of the lens 26 facing the door 4. The mirror 28 extends from the rear end portion of the lens 26 toward the light emitting devices 24a–24g.

As shown in FIGS. 3A, 3B and 3C, the combination of the convex lens 26 and the mirror 28 is rotatable about a rotation center, which is the center of the lens 26 indicated by a phantom circle in FIGS. 3A, 3B and 3C. Specifically, the combination of the lens 26 and the mirror 28 can be continuously moved between a first position shown in FIG. 3A and a third position shown in FIG. 3C, through a second position shown in FIG. 3B. In the first position shown in FIG. 3A, the upper edge of the mirror 28 is substantially tangent to those portions (LC) of the respective beams emitted from the center of the respective light emitting devices 24a–24g. In the second position, the upper edge of the mirror 28 is slightly away from the center portions of the respective beams toward the door 4, as shown in FIG. 3B. In the third position, the upper edge of the mirror 28 is further away from the center portions of the beams. In FIGS. 3A, 3B and 3C, only one light emitting device, namely, the light emitting device 24d, is shown, and the remaining devices are not shown for simplicity of illustration.

The light emitting devices 24a through 24g and the combination of the convex lens 26 and the mirror 28 are so arranged that the respective center beam portions LC propagate substantially perpendicularly to the floor 14.

The light emitter-receiver section 20 includes also a light receiver 30 which receives light beams coming from the floor side. The light receiver 30 has seven light receiving devices 32a through 32g corresponding to the seven light receiving devices 24a through 24g. The light receiving devices 32a–32g are disposed in a manner similar to the light emitting devices 24a–24g and adapted to receive reflected versions of the light beams which have been emitted by the light emitting devices 24a–24g and come through a convex lens 34. A mirror 36 functioning as light-collecting means is fixed to the rear end of the convex lens 34, like the mirror 28. The combination of the convex lens 34 and the mirror 36 is also arranged to be rotatable about the center of the convex lens 34. A coupling member 38 couples the lenses 26 and 34 to link the combination of the lens 34 and the mirror 36 to the combination of the convex lens 26 and the mirror 28, so that the two lens-mirror combinations can be rotated in synchronization with each other. For the purpose of rotating these lens-mirror combinations from outside the composite sensor 2, a lever 40 is provided which has one end coupled to the lens 26. The other end of the lever 40 extends out of the sensor 2.

The light beams emitted and received by the light emitter-receiver section 20 form an optical detection zone 42. The optical detection zone 42 extends between the sensor 2 and the floor 4. (See FIGS. 1 and 2, for example.) The optical detection zone 42 functions as a safeguard zone for detecting a pedestrian standing near the door 4. As shown, for example, in FIG. 2, the bottom section of the optical detection zone 42 is located near and substantially in parallel with the door 4 and has a length approximately equal to the width of the door 4. The depth of the lower section of the zone 42 (i.e. the dimension of the zone 42 perpendicular to the door surface 4a) can be enlarged and reduced by manipulating the lever 40. Thus, the mirrors 28 and 36 and the lever 40 for varying the orientation of the mirrors 28 and 36 form optical detection zone modifying means.

In the first position shown in FIG. 3A, the frontmost portion (LF) of the light beam emitted by each of the light emitting devices 24a–24g into the predetermined light-emitting angular range passes through the center of the lens 26 toward the floor 14. The frontmost portion intended herein is the portion remotest from the door 4. As mentioned previously, in FIGS. 3A through 3C, only the light emitting device 24d is shown as the representative of the light-emitting devices 24a–24g. The center light beam portion LC traveling through the center of the predetermined angular range propagates downward toward the floor 14. Similarly, the light beam portions between the portions LF and LC travel toward the floor 14. This results in a single optical detection zone 42a formed to extend from a first floor region locating close to the door 4 toward the sensor 2, as shown in FIGS. 1, 2, 6 and 7.

Light beam portions traveling nearer to the door 4 than the center light beam portion LC are not reflected by the mirror 28 toward the floor. In FIGS. 3A through 3C, the rearmost beam portion LB, i.e. the beam portion nearest to the door 4, only is shown as the representative of such light beams. Thus, these beam portions do not constitute the optical detection zone. As shown in FIGS. 1, 2, 6 and 7, only one optical detection zone 42 is formed. Reflection of the light beams emitted to form the optical detection zone 42a by the light emitting devices 24a–24g and reflected by the floor 14 and other matters, such as a pedestrian, impinges onto the corresponding light receiving devices 32a through 32g via the convex lens 34 and the mirror 36.

Figure 8:
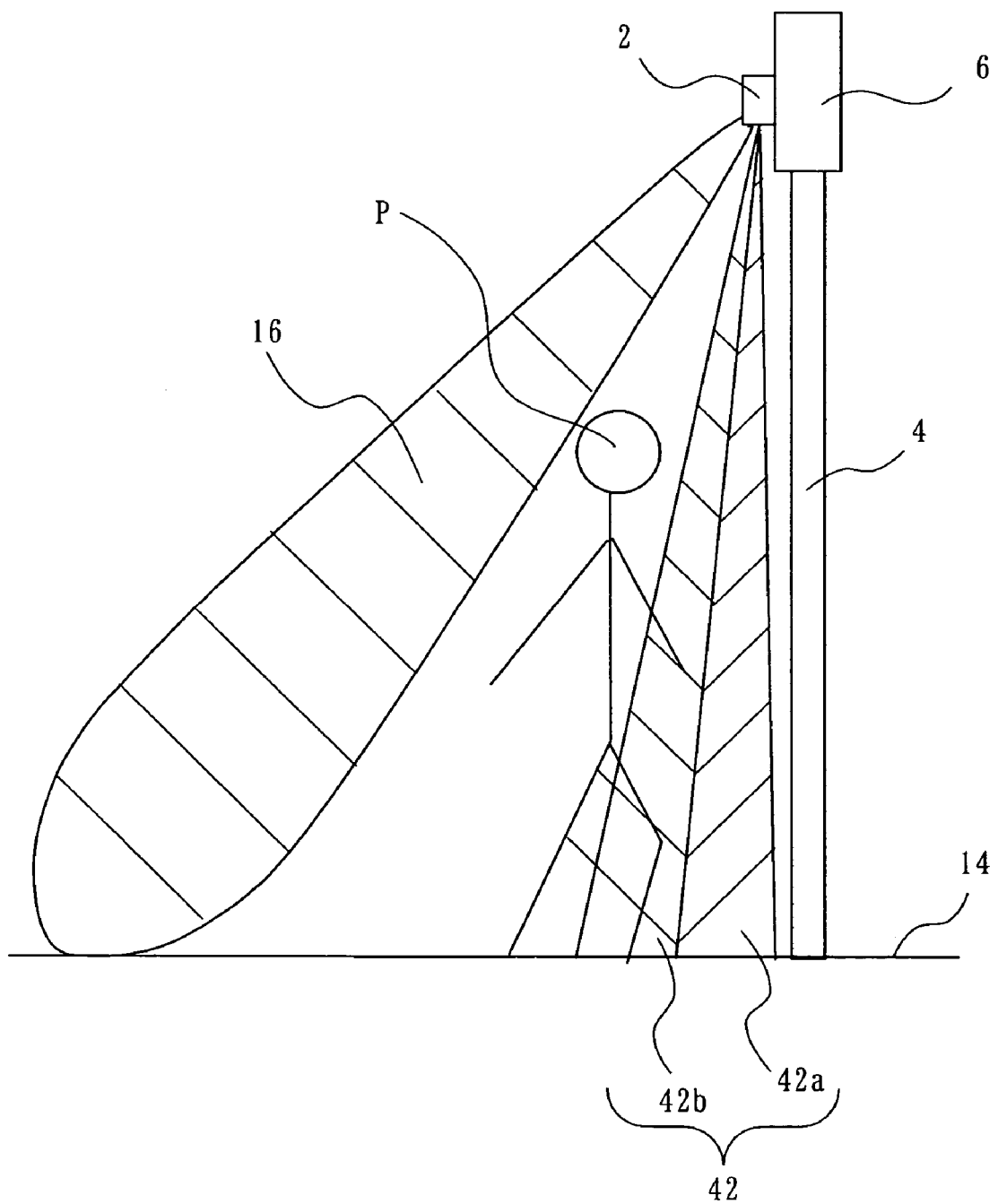
FIG. 8 is a side view of the composite sensor shown in FIG. 1 with the angle of the radio-wave detection zone with respect to the door is surface set to a larger value, and with the optical detection zone enlarged.
Figure 9:
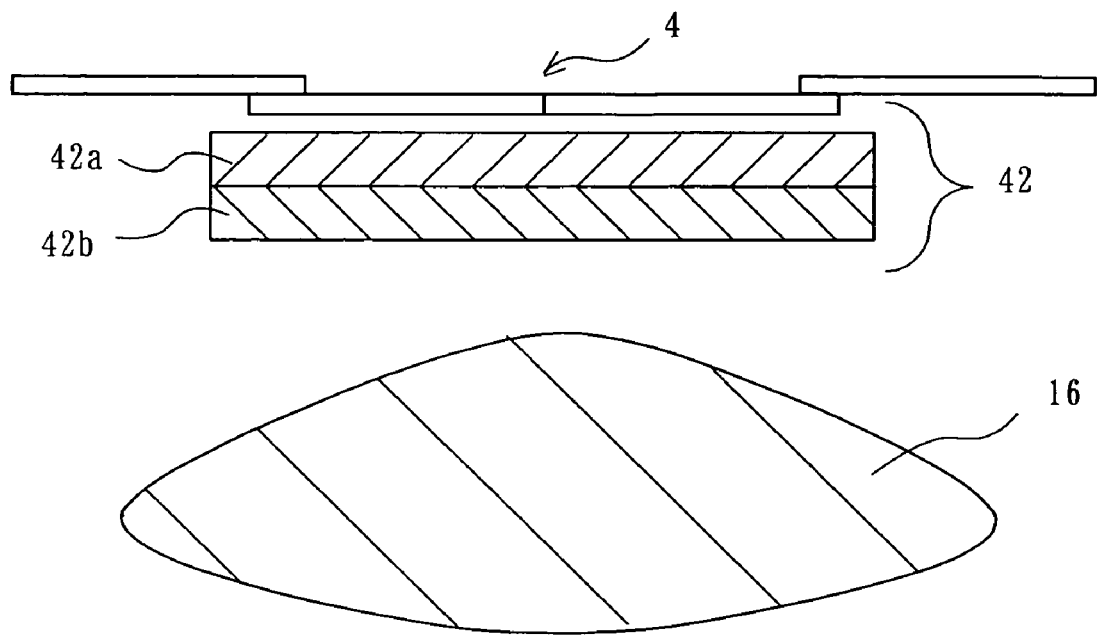
FIG. 9 is a plan view of the arrangement shown in FIG. 8.

In the second position shown in FIG. 3B, the optical detection zone 42a is formed in a manner similar to the above-described one. However, since the mirror 28 is tilted further toward the door 4, with the top edge of the mirror 28 locating closer to the door 4 than in the first position, the light beam portions closer to the door 4 than the center beam portion LC, e.g. the light beam portion LB and a light beam portion LB1 between the beam portion LB and the center beam portion LC, are reflected by the mirror 28 and impinge on a second floor region adjacent to the first floor region on which the optical detection zone 42a expands on the floor 14. This results in, as shown in FIGS. 8 and 9, the formation of another optical detection zone 42b extending between the second floor region and the composite sensor 2. The reflected versions of the light beams emitted by the light emitting devices 24a–24g to form the optical detection zone 42b and reflected by the floor 14 and/or an object etc. pass through the convex lens 34 and the mirror 36 and impinge onto the corresponding light receiving devices 32a–32g. Like this, in the second position of the lens-mirror combination, the depth dimension of the optical detection zone, i.e. the dimension along the direction perpendicular to the door surface, is enlarged by the formation of the second detection zone 42b.

Figure 11:
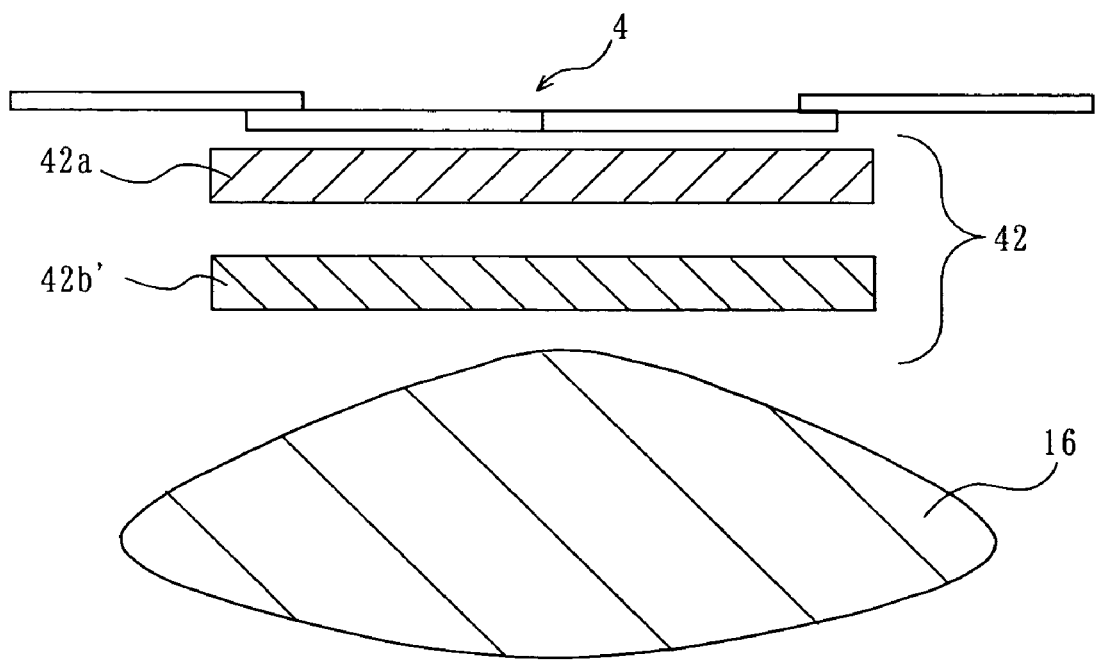
FIG. 11 is a plan view of the arrangement shown in FIG. 10.
Figure 10:
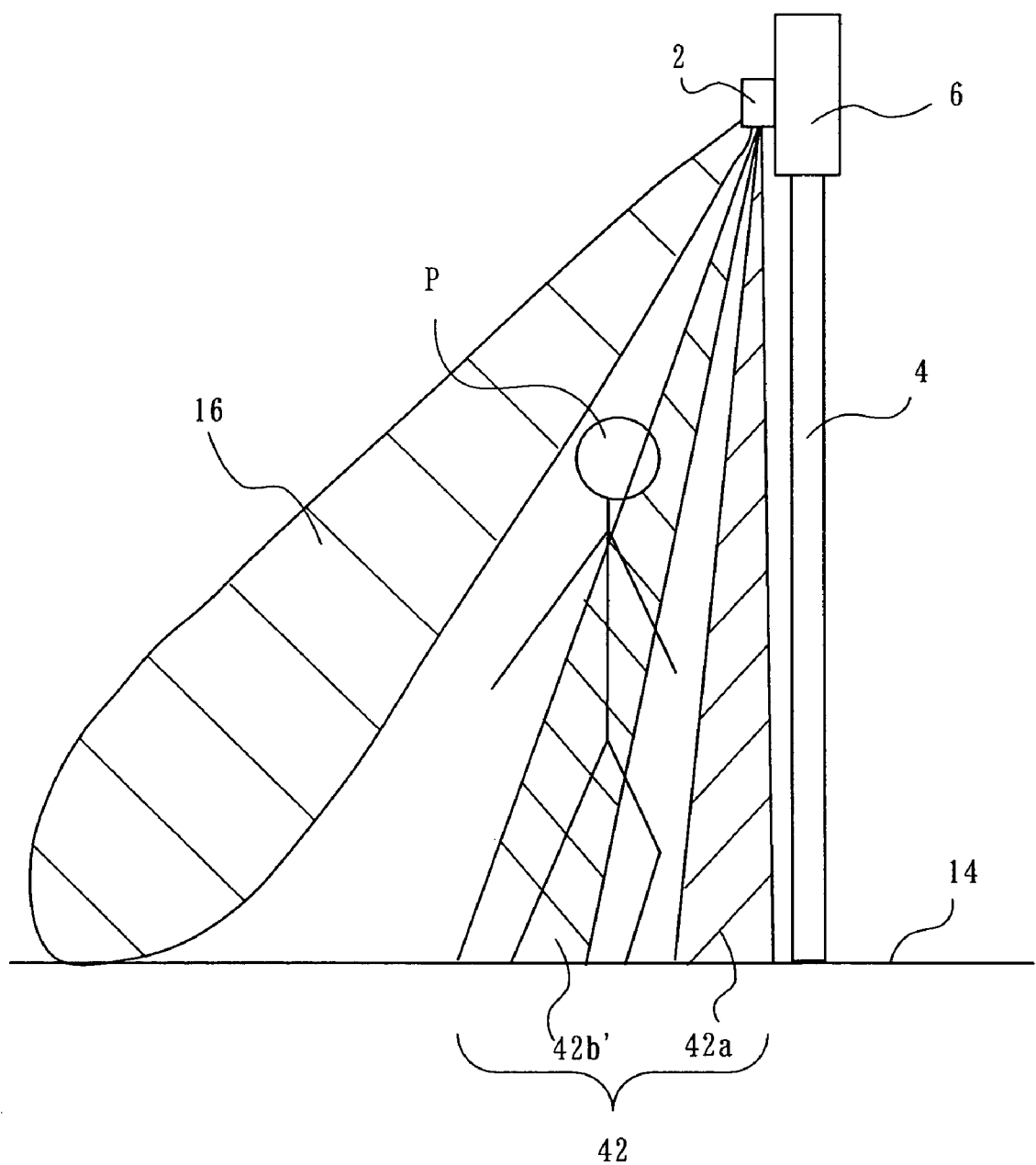
FIG. 10 is a side view of the composite sensor shown in FIG. 1 with the angle of the radio-wave detection zone with respect to the door surface set to a larger value, and with the size of the optical detection zone reduced to the largest degree, but with the optical detection zone modified from the one shown in FIG. 8.

In the third position shown in FIG. 3C, the mirror 28 is tilted further toward the door 4 than in the second position. This causes the light beam portions LB and LB1 to reach a third floor region at a location remoter from the door 4 than the second floor region. As a result, as shown in FIGS. 10 and 11, in addition to the optical detection zone 42a, an optical detection zone 42b' is formed to extend between the third floor region, which is remoter from the door than the optical detection zone 42b, and the composite sensor 2. The reflected versions of the respective light beam portions emitted by the respective light emitting devices 24a–24g toward the third floor region to form the optical detection zone 42b pass through the convex lens 34 and the mirror 36 and impinge on the corresponding light receiving devices 32a–32g. Thus, in the third position of the lens-mirror combination, the depth dimension of the optical detection zone 42 becomes larger than in the second position by virtue of the optical detection zone 42b' formed at a location spaced from the optical detection zone 42a.

The dimension of the optical detection zone 42 in the depth direction can be continuously reduced by moving the lens-mirror combination from the third position to the second position, and from the second to the first position. It should be noted that, in the above description, the function of the convex lens 26 is not taken into consideration for simplicity of explanation.

Figure 5:
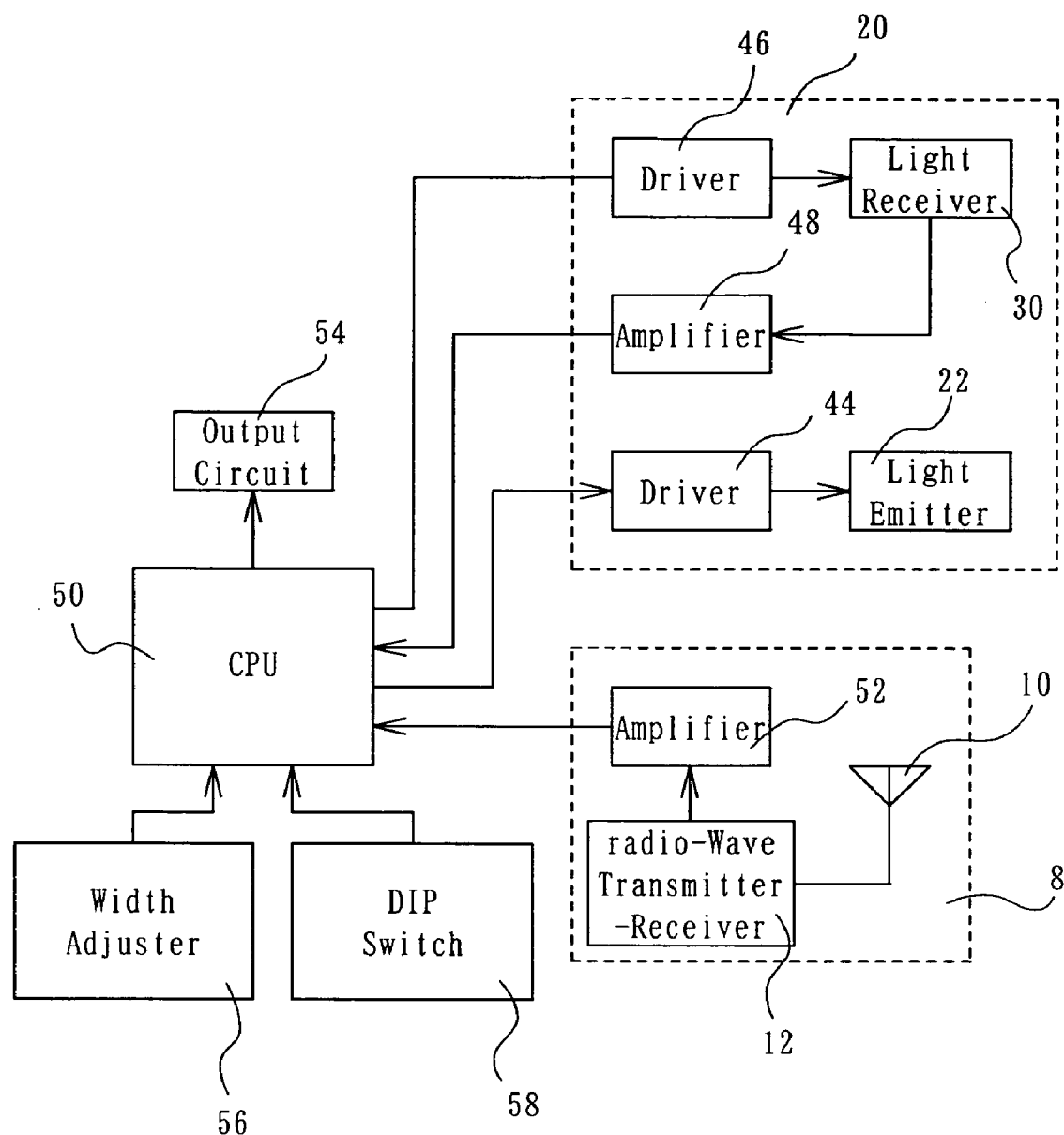
FIG. 5 is a block circuit diagram of the composite sensor shown in FIG. 1.

As shown in FIG. 5, the light emitter 22 is driven by a driver circuit 44 in the light emitter-receiver section 20. The light receiver 30 is driven by a driver circuit 46 in the light emitter-receiver section 20. Received-light representative signals outputted from the respective light receiving devices 32a through 32g are amplified in an amplifier circuit 48 in the light emitter-receiver section 20 and applied to control means, e.g. a CPU 50. The driver circuits 44 and 46 are controlled by the CPU 50. A received-radio-wave representative signal from the radio-wave transmitter-receiver section 12 is amplified in an amplifier circuit 52 in the radio-wave transmitting-receiving module 8, and is applied to the CPU 50.

The CPU 50 compares each of the amplified received-light representative signals from the amplifier circuit 48 and the amplified receive-radio-wave representative signals with respective predetermined reference values, to thereby make judgment as to whether a moving object or a stationary object has been detected. The result of judgment is supplied through an output circuit 54 to a door control circuit (not shown) external to the composite sensor 2 for controlling the operation of the door 4.

The CPU 50 is provided with a radio-wave detection zone width adjuster 56 for adjusting the width of the radio-wave detection zone 16. The CPU 50 is provided also with an optical detection zone width adjusting DIP switch 58, through which one or more of the light receiving devices 32a through 32g providing received-light representative signals to be used are selected, to thereby adjust the width of the optical detection zone 42. The widths of the detection zones 16 and 42 are adjusted in accordance with the width of the door 4.

The CPU 50, the output circuit 54, the radio-wave detection zone width adjuster 56, and the optical detection zone width adjusting DIP switch 58 are disposed in the composite sensor 2.

As described above, the angle θ (FIG. 1) of the center line of the radio-wave detection zone 16 with respect to the door surface 4a is adjustable. As shown in FIGS. 1 and 2, by setting the angle θ to a small angle, e.g. 21°, even if the lever 40 so manipulated to place the lens-mirror combination in the first position to thereby form only the optical detection zone 42a, the gap between the radio-wave detection zone 16 and the optical detection zone 42a is small. Accordingly, a pedestrian P going out of the radio-wave detection zone 16 toward the door 4 can immediately enter into the optical detection zone 42 and be detected by the light emitter-receiver section 20. Thus, if the pedestrian P stops there, it never occurs that he or she cannot be detected at all, and the door 4 is kept open. After that, the pedestrian re-starting to move toward the door 4 can, therefore, pass through the door 4.

Figure 7:
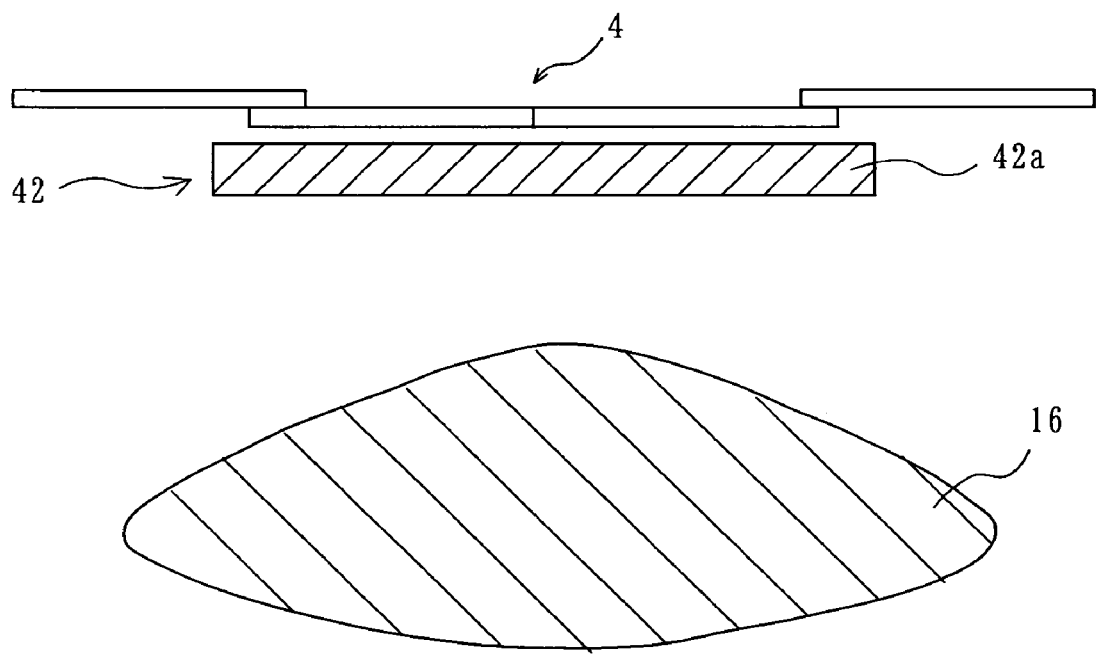
FIG. 7 is a plan view of the arrangement shown in FIG. 6.
Figure 6:
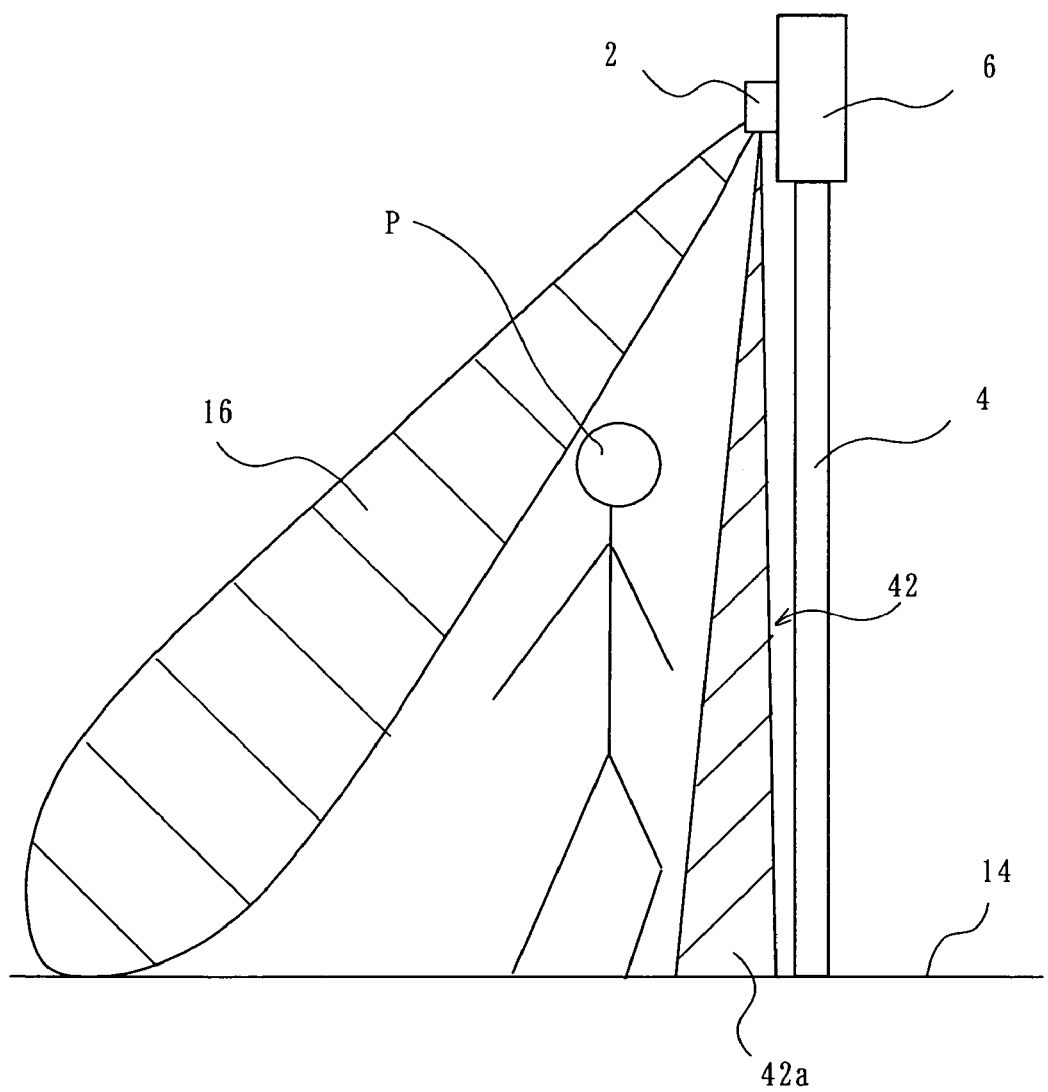
FIG. 6 is a side view of the composite sensor shown in FIG. 1 with the angle of the radio-wave detection zone with respect to the door surface set to a larger value, and with the size of the optical detection zone reduced to the largest degree.

A door owner may desire that the door 4 be opened earlier by so setting the radio-wave transmitter-receiver section 12 as to be able to detect a pedestrian P at a location relatively remote from the door 4. For that purpose, the angle of the center line of the radio-wave detection zone 16 with respect to the door surface 4a may be set larger, e.g. 45°. This is illustrated in FIGS. 6 and 7. With the angle set to 45°, and with the lens-mirror combination place in the first position to provide only the optical detection zone 42a, there will be a larger gap produced between the radio-wave detection zone 16 and the optical detection zone 42a. If the pedestrian P stops immediately after he or she goes out of the radio-wave detection zone 16, neither the radio-wave transmitter-receiver section 12 nor the light emitter-receiver section 20 may not detect him or her. Then, the door 4 will be controlled to close, and, if the pedestrian P starts moving again toward the door 4, it is possible for him or her to collide with the door 4.

To avoid such accident, the lever 40 is manipulated to place the lens-mirror combination in the second position, beforehand. Then, as shown in FIGS. 8 and 9, the optical detection zone 42 is formed of the two optical detection zones 42a and 42b located adjacent to the door 4. As a result, the depth dimension of the optical detection zone 42 is increased to thereby decrease the width of the gap between the radio-wave detection zone 16 and the optical detection zone 42. Accordingly, when the pedestrian P goes out of the radio-wave detection zone 16, at least part, a leg, for example, of the body of the pedestrian P can enter into the optical detection zone 42b. Then, the pedestrian P can be detected by the light emitter-receiver section 20 even if he or she stops there, and, therefore, the door 4 is kept open.

Alternatively, the lens-mirror combination may be placed in the third position to form, in addition to the optical detection zone 42a, the optical detection zone 42b' at a location spaced from the zone 42a and near to the radio-wave detection zone 16, as shown in FIGS. 10 and 11. This alternative method can increase the depth dimension of the optical detection zone 42, i.e. the distance between the edge of the optical detection zone 42a closer to the door 4 and the edge of the optical detection zone 42b' closer to the radio-wave detection zone 16, relative to the depth dimension provided when the lens-mirror combination in the second position. Accordingly, when the pedestrian P goes out of the radio-wave detection zone 16, at least part of his or her body enters into the optical detection zone 42b, and, therefore, he or she can be detected by the light emitter-receiver section 20 even if he or she stops moving there.

When the lens-mirror combination is in the second position, and if the pedestrian P walks with short steps and stops walking after he or she goes out of the radio-wave detection zone 16 and before he or she enters into the optical detection zone 42b, there is a possibility that the pedestrian may not be detected by the light emitter-receiver section 20. In contrast, if the lens-mirror combination is in the third position, even if the pedestrian P walks with short steps toward the door 4, he or she, upon going out of the radio-wave detection zone 16, can enter into the optical detection zone 42b', which is formed close to the radio-wave detection zone 16, and, therefore, can be detected by the light emitter-receiver section 20.

Since the gap between the optical detection zones 42b' and 42a is small, part of the pedestrian P moving from the optical detection zone 42b' to the zone 42a is always in either of these zones. Accordingly, if the pedestrian P stops at a location between the two optical detection zones 42b' and 42a, he or she can be detected by the light emitter-receiver section 20 without fail.

If the door owner desires, a sensor installer installing the sensor 2 sets the sensor 2 to form the optical detection zone 42 including, in addition to the optical detection zone 42a, the optical detection zone 42b or 42b'.

The light emitter-receiver section 20 has been described to include the convex lenses 26 and 34, but the lenses may be eliminated. Also, the lenses 26 and 34 may be double convex lenses as in the described embodiment, or may be other lenses, such as piano-convex lenses.

The composite sensor for a door according to the first embodiment uses infrared light to form the optical detection zone 42, which is susceptible to disturbances, such as rainfall and snowfall. If raindrops or snowflakes fall into the optical detection zone 42, there is a possibility of their being detected erroneously as a pedestrian, causing the door 4 to undesirably be opened. A composite door sensor according to a second embodiment is free of such disadvantage. In the following description of the composite door sensor according to the second embodiment, the same reference numerals are attached to the components and functions same or similar to those of the above-described composite door sensor according to the first embodiment, and their detailed description is not given. In the following description, the radio-wave detection zone 16 and optical detection zone 42 are referred to as activation zone 16 and safeguard zone 42, respectively, for simplicity of explanation.

Figure 12:
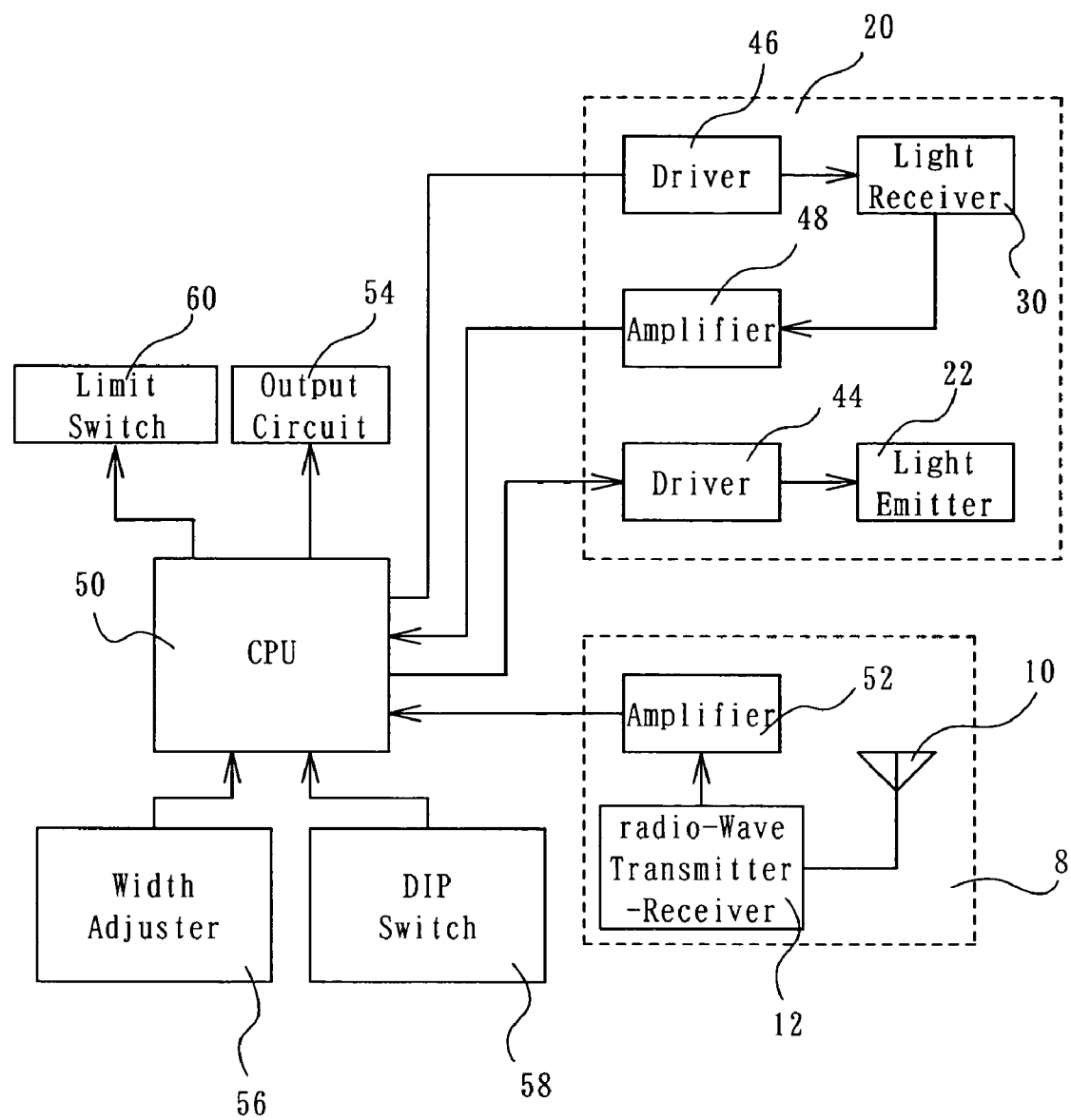
FIG. 12 is a block circuit diagram of a composite sensor for a door according to a second embodiment of the invention.
Figure 13:
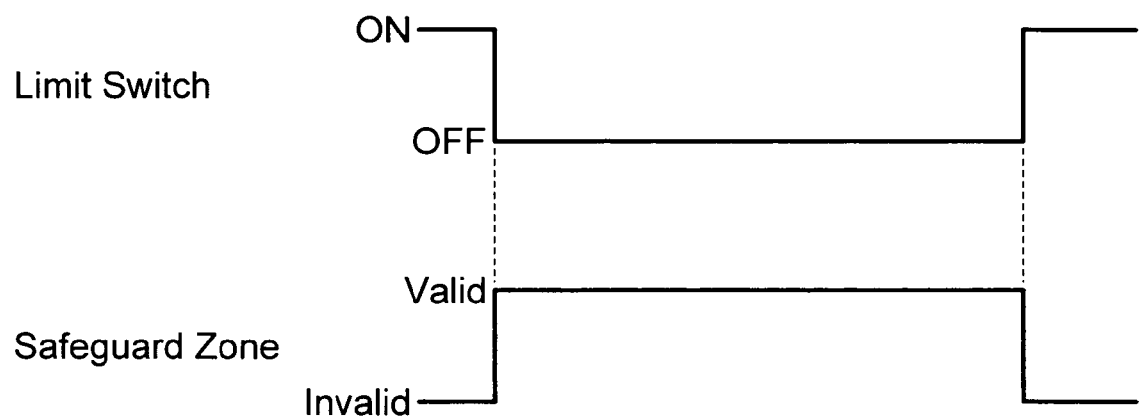
FIG. 13 shows the validation and invalidation of a safeguard zone in relation to the timing of an output of a limit switch for the composite sensor shown in FIG. 12.

As shown in FIG. 12, according to the second embodiment, door position detecting means for sensing whether the door 4 is in its closed position is used in association with the CPU 50. The door position detecting means may be a limit switch 60, for example. The limit switch 60 is disposed in the lintel 6. The limit switch 60 is turned ON when the door 4 is in the closed position, and otherwise is turned OFF. The CPU 50 monitors the limit switch 60 as to find whether it is ON or OFF. As shown in FIG. 13, if the switch 60 is ON, the result of detection in the safeguard zone 42 is invalidated. In other words, when the limit switch 60 is ON, a safeguard zone signal, i.e. a received-light representative signal, inputted to the CPU 50 from the light emitter-receiver section 20 is ignored, and it is treated as if there is no pedestrian in the safeguard zone 42. On the other hand, when the limit switch 60 is OFF, the result of detection in the safeguard zone 42 is made valid and is reflected in the sensor output.

The operation of the CPU 50 is controlled in the following manner according to control programs stored in memory means, for example, a memory, built in the CPU 50, for example.

Figure 14:
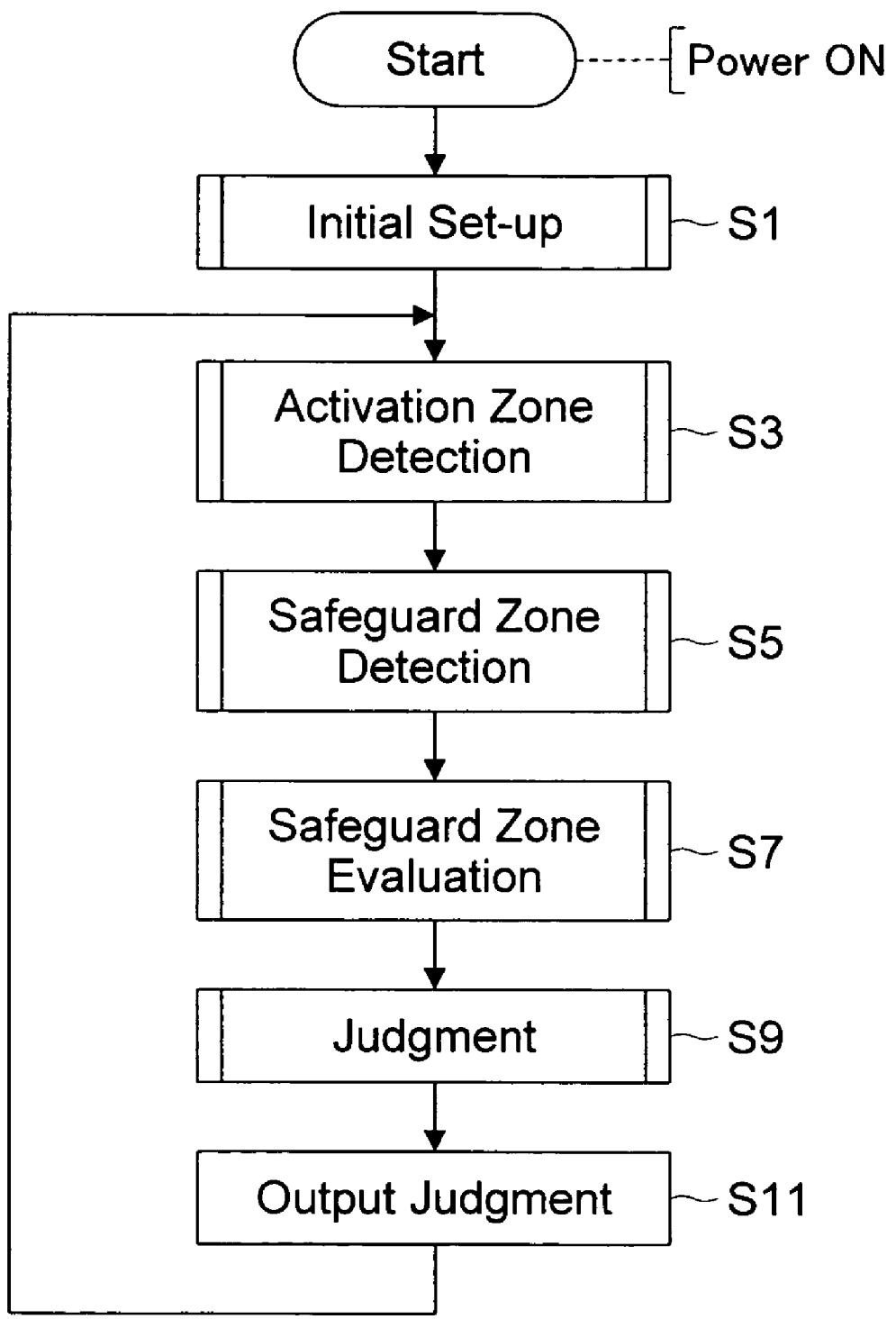
FIG. 14 is a flow chart of a main routine executed by a CPU of the composite sensor of FIG. 12.

Referring now to FIG. 14, when a power switch (not shown) of the sensor 2 is turned ON, the CPU 50 first executes an initial set-up processing (Step S1). In the initial set-up processing, the CPU 50 diagnoses itself, and finds the states of the radio-wave detection zone width adjuster 56 and the DIP switch 58. In accordance with the found states, the detection level of the activation zone detection signal, i.e. the received-radio-wave representative signal, supplied to the CPU 50 from the radio-wave transmitting-receiving module 8 is adjusted to set the width dimension of the activation zone 16, and, at the same time, the driver circuits 44 and 46 in the light emitter-receiver section 20 are controlled to set the width dimension of the safeguard zone 42. In addition, the CPU 50 invalidates the result of detection in the safeguard zone 42.

After the initial set-up processing, the CPU 50 executes activation zone detection processing in Step S3. Specifically, the CPU 50 sees the event in the activation zone 16, i.e. makes a judgment as to whether there is an object in the activation zone 16 based on the activation zone signal supplied to the CPU 50 from the radio-wave transmitter-receiver module 8.

Then, the CPU 50 executes safeguard zone detection processing in Step S5, in which it checks the safeguard zone 42 for its state based on the safeguard zone detection signal applied from the light emitter-receiver section 20. If raindrops or snow flaks are blown into the safeguard zone 42, they may be detected as a pedestrian.

After the execution of Step S5, the CPU 50 executes safeguard zone evaluation processing in Step S7 to evaluate the result of detection made in Step S5 as to whether the result is reasonable or not. Based on the evaluation made, the result of detection made in Step S5 is validated or invalidated. The processing in Step S7 will be described in detail later.

After the execution of Step S7, the CPU 50 executes judgment processing in Step S9 to judge whether or not an object is present in at least one of the activation and safeguard zones 16 and 42. Specifically, if the result of detection made in Step S5 has been validated in Step S7, the CPU 50 makes a judgment as to whether or not there is an object, based on both of the results of detection obtained in Steps S3 and S5. On the other hand, if the result of detection obtained in Step S5 is invalidated in Step S7, the presence or absence of an object is judged based only on the result of detection obtained in Step S3.

After the execution of Step S9, the CPU 50 advances to Step S11, where the judgment made in Step S9 is outputted. The judgment is outputted, as the sensor output of the composite sensor 2, through the output circuit 50 and applied to the controller.

After the execution of Step S11, the CPU 50 returns to Step S3 and repeats the execution of Steps S3 through S11 in the same manner as described. If the power switch is turned OFF during the execution of these steps, the CPU 50 stops the series-of execution shown in FIG. 14.

Figure 15:
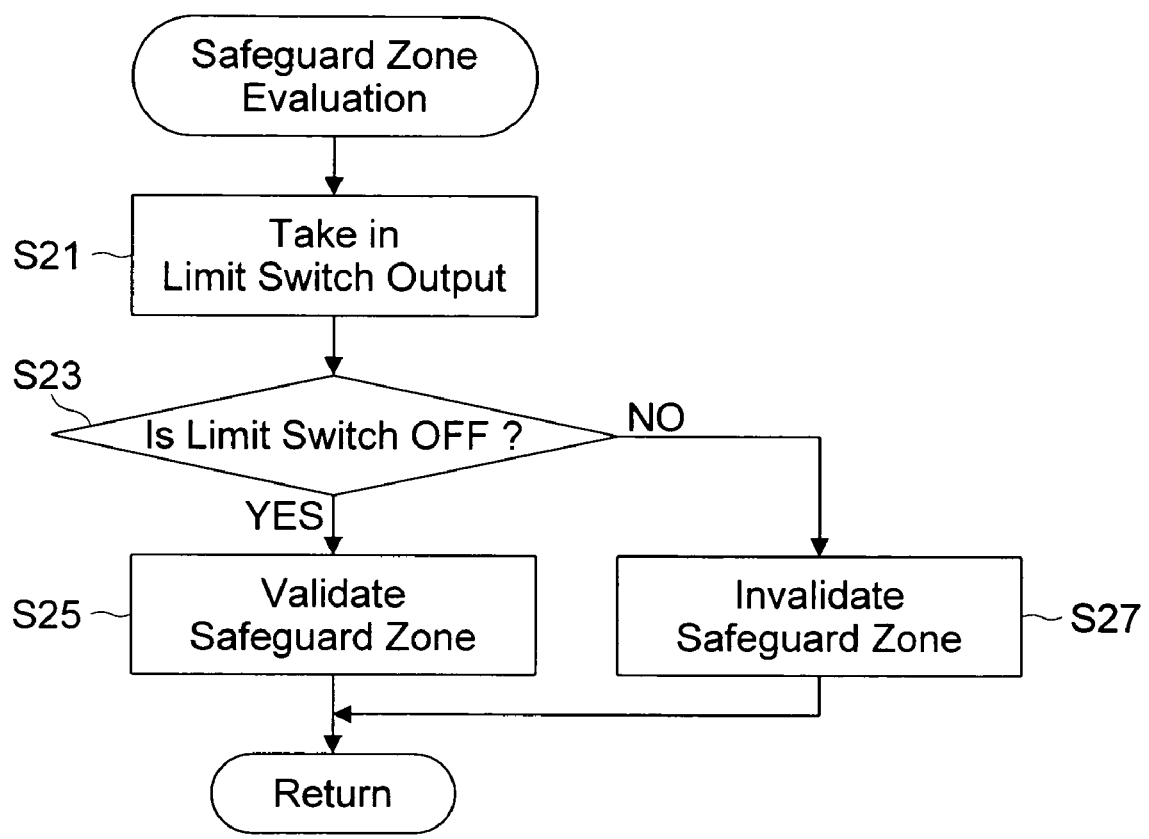
FIG. 15 is a flow chart illustrating the detail of safeguard zone evaluation processing shown in FIG. 14.

The safeguard zone evaluation processing in Step S7 is carried out in accordance with the procedure illustrated by a flow chart shown in FIG. 15. The CPU 50 takes in an output of the limit switch 60 in Step S21. In Step S23, the limit switch output is used to judge whether the limit switch 60 is OFF.

If the limit switch 60 is OFF, that is, if the door 4 is not in its closed position, the processing by the CPU 50 advances to Step S25, in which the result of detection in the safeguard zone 42 is made valid, and the safeguard zone evaluation processing shown in FIG. 15 is ended. If the limit switch 60 is not OFF, that is, if the door 4 is in the closed position, the processing advances from Step S23 to Step S27, where the result of detection in the safeguard zone 42 is made invalidat, and the safeguard zone evaluation processing is ended.

According to the above-described second embodiment, if raindrops or snowflakes are erroneously detected as a pedestrian, the result of detection in the safeguard zone 42 when the door 4 is in the closed position is ignored and is not reflected in the sensor output. Accordingly, erroneous operation of the automatic door which would be caused by external disturbance, such as rain and snow, can be reduced.

The composite sensor according to the second embodiment has been described to use the limit switch 60 for finding whether the door 4 is in the closed position, but other means may be used instead. For example, an output of a rotary encoder for detecting the position of the door 4 mounted on the rotary shaft of a motor driving the door 4 to open or close may be used to find if the door 4 is in the closed position.

Figure 16:
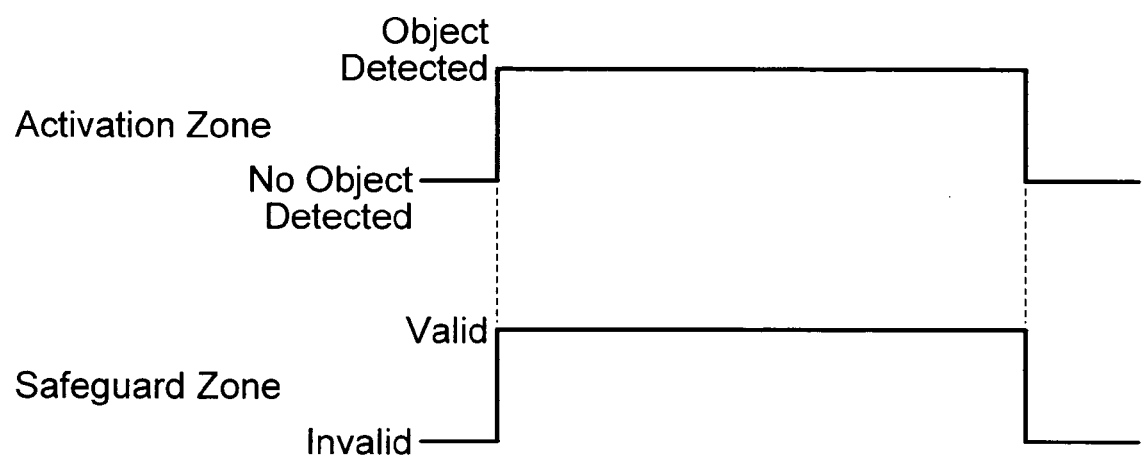
FIG. 16 shows the validation and invalidation of a safeguard zone in relation to the detection of an object in an activation zone of a composite sensor according to a third embodiment of the present invention.
Figure 17:
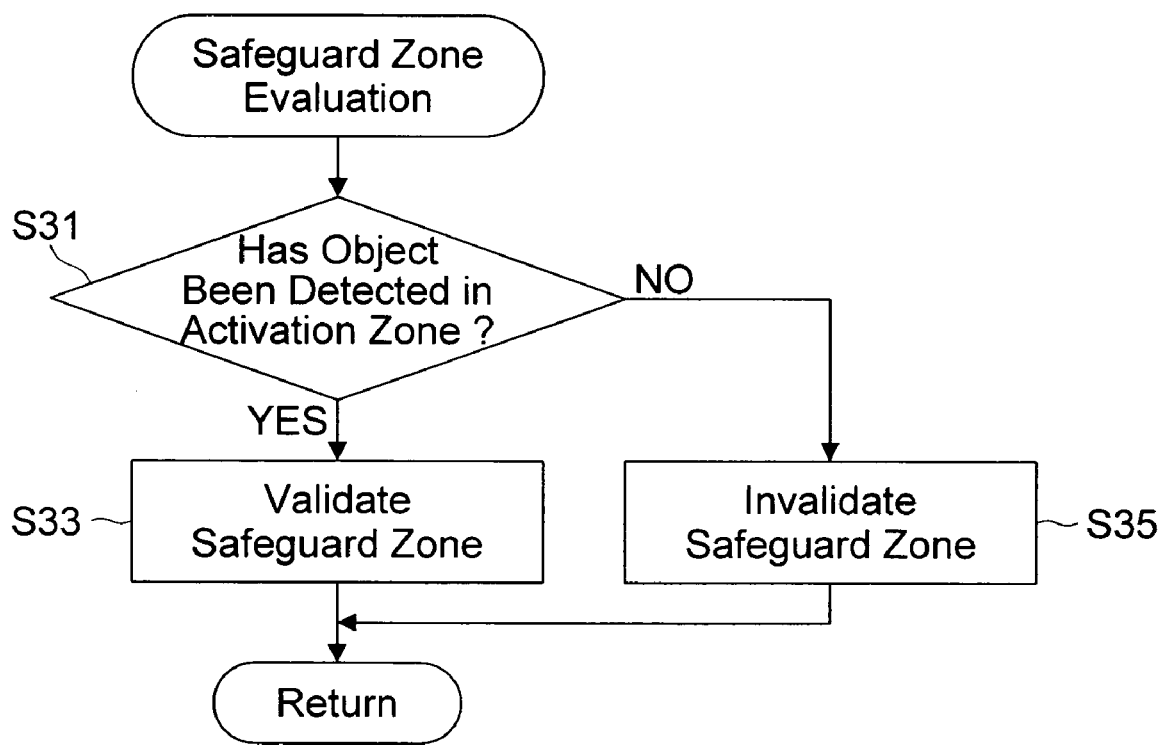
FIG. 17 is a flow chart illustrating the detail of safeguard zone evaluation processing in the composite sensor according to the third embodiment of the present invention.

Now, referring to FIGS. 16 and 17, a sensor according to a third embodiment is described. The composite sensor according to the third embodiment is the same in hardware as the sensor of the second embodiment, and only the operation of the CPU 50, i.e. the control program, and, more particularly, the processing in Step S7 (safeguard zone evaluation processing) shown in FIG. 14, is different.

The CPU 50 of the third embodiment operates to validate the result of detection in the safeguard zone 42 only when an object or pedestrian is detected in the activation zone 16, and otherwise invalidate the result of detection in the safeguard zone 42.

For that purpose, the CPU 50 operates to execute the safeguard zone evaluation processing, along the procedure as illustrated by a flow chart shown in FIG. 17. First, the CPU 50 makes a judgment, in Step S31, as to whether an object has been detected in the activation zone 16. This judgment is made based on the result of detection obtained in Step S3 shown in FIG. 14.

If it is judged, in Step S31, that an object has been detected, the CPU 50 advances to Step S33, where it validates the result of detection in the safeguard zone 42, and ends the safeguard zone evaluation processing of FIG. 17. On the other hand, if no object has been detected in activation zone 16, the CPU 50 advances from Step S31 to Step S35 and invalidates the result of detection in the safeguard zone 42. Then, the safeguard zone evaluation processing is ended.

According to the third embodiment, only when an object is detected in the activation zone 16, the result of detection in the safeguard area 42 is validated. Accordingly, even when raindrops or snowflakes are detected erroneously as a pedestrian in the safeguard zone 42, the result of detection in the safeguard zone 42 is ignored, if no object is in the activation zone 16, and has no effect on the sensor output. Thus, occurrence of erroneous operation of the door 4 which would be caused by disturbance, such as rain and snow, can be reduced.

Figure 18:
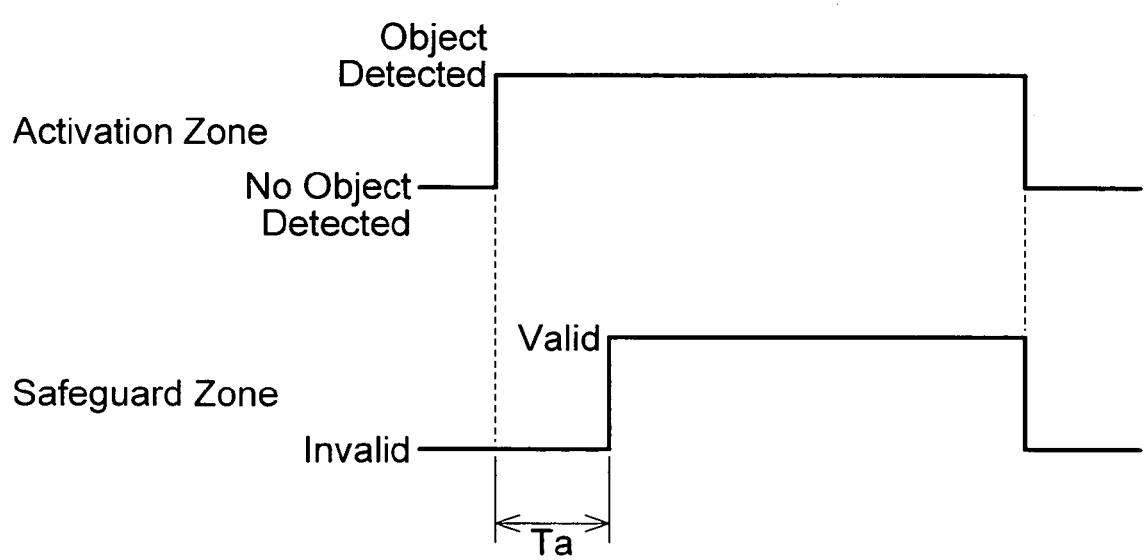
FIG. 18 shows the validation and invalidation of a safeguard zone in relation to the detection of an object in an activation zone of a composite sensor according to a fourth embodiment of the present invention.
Figure 19:
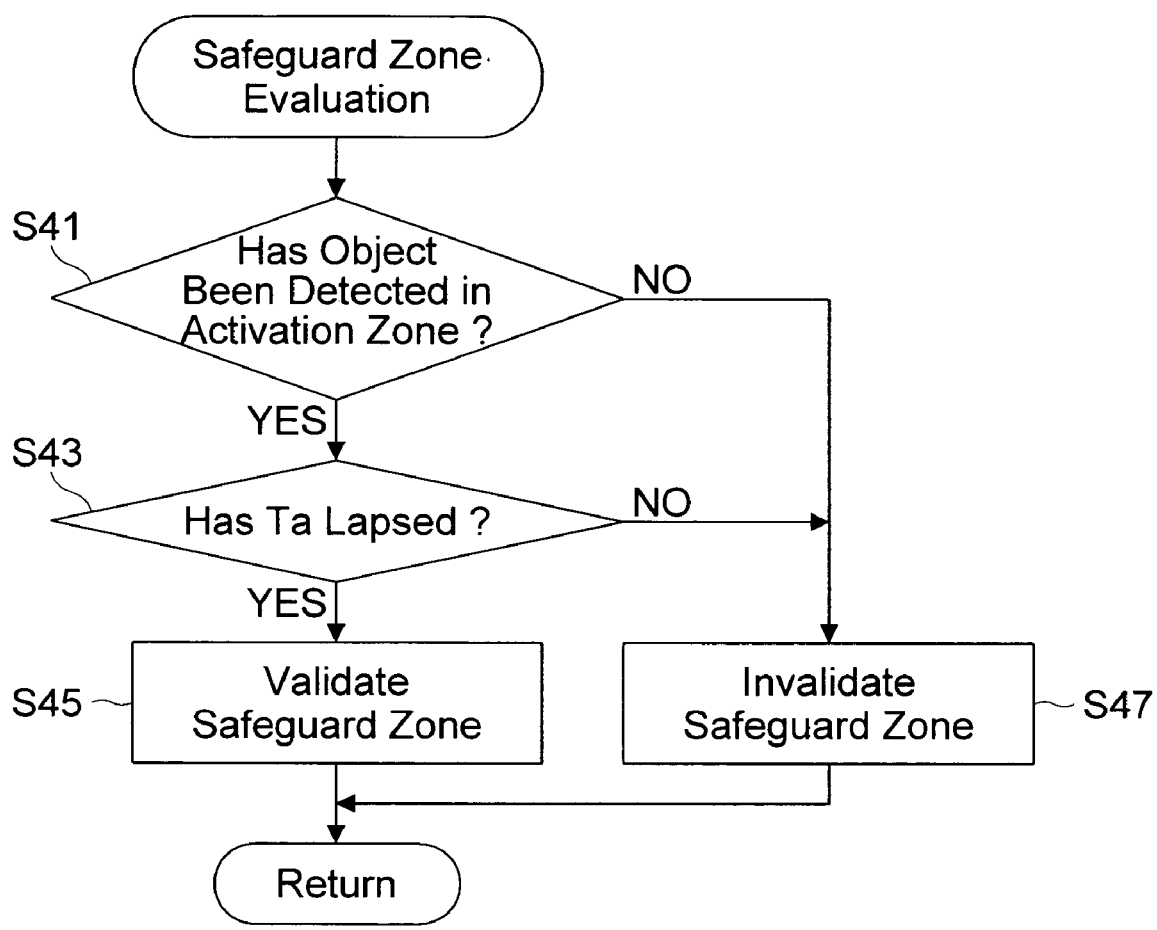
FIG. 19 is a flow chart illustrating the detail of safeguard zone evaluation processing in the composite sensor according to the fourth embodiment of the present invention.

Next, referring to FIGS. 18 and 19, a fourth embodiment is described. The sensor according to the fourth embodiment is also the same in hardware as the sensor of the second embodiment, and differs only in the operation of the CPU 50, i.e. the content of the safeguard zone evaluation processing (Step S7 shown in FIG. 14).

The CPU 50 of the sensor according to the fourth embodiment operates to validate the result of detection in the safeguard zone 42 only when an object is detected in the activation zone 16 and the object is continuously detected for a first time period of Ta, as shown in FIG. 18, and otherwise invalidates the result of detection in the safeguard zone 42. The time period Ta may be from one (1) second to 2 (two) seconds, for example.

For that purpose, the CPU 50 executes the safeguard zone evaluation processing in the manner as shown in FIG. 19. The CPU 50 first makes judgment, in Step S41, as to whether an object has been detected in the activation zone 16, based on the result of detection obtained in Step S3 in the, processing shown in FIG. 14.

If an object has been detected in the activation zone 16, the CPU 50 executes Step S43 to judge whether the time period Ta has been passed since the object was detected in the activation zone 16. The measurement of the time period Ta is made by what is called a software timer. If it is judged that the time Ta has passed, the CPU 50 advances to Step S45 to validate the result of detection in the safeguard zone 42, and, the safeguard zone evaluation processing of FIG. 19 is ended.

If no object is detected in Step S41, the CPU 50 advances to Step is S47. In Step S47, the result of detection in the safeguard zone 42 is invalidated or ignored, and, then, the safeguard zone evaluation processing is ended. Also, if it is judged that the time period Ta has not lapsed in Step S43, the processing advances to Step S47, and, then, is ended.

As described, according to the fourth embodiment, only when an object is continuously detected in the activation zone 16 for a time period of Ta, the result of detection in the safeguard zone 42 is validated. Accordingly, when only an object moving in the activation zone 16, but goes out of it before the time period Ta lapses, or, in other words, only an object moving simply across the door 4, is detected, the result of detection in the safeguard zone 16 is not validated or used. This arrangement can prevent unnecessary validation of the result of detection in the safeguard zone 16, and, therefore, occurrences of erroneous operation of the automatic door which would be caused by external disturbance like raindrops and snowflakes can be reduced.

Next, a composite sensor according to a fifth embodiment of the invention is described with reference to FIGS. 20 and 21. The sensor according to the fifth embodiment, too, is the same in hardware as the sensor according to the second embodiment, and the only difference is in the safeguard zone evaluation processing.

Figure 20:
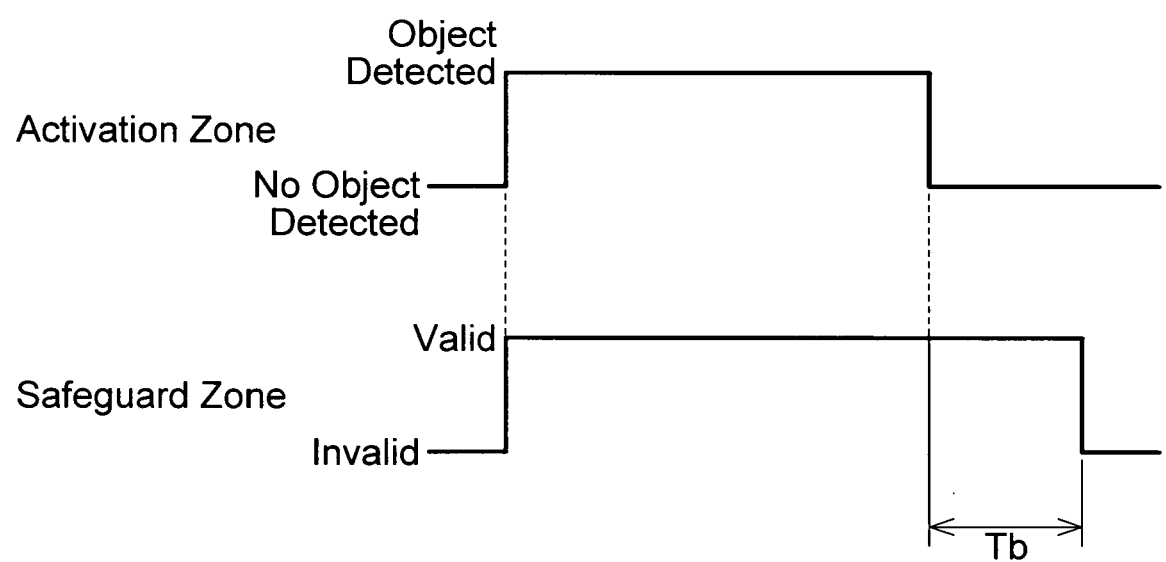
FIG. 20 shows the validation and invalidation of a safeguard zone in relation to the detection of an object in an activation zone of a composite sensor according to a fifth embodiment of the present invention.

As shown in FIG. 20, the CPU 50 of the sensor according to the fifth embodiment validates the result of detection in the safeguard zone 42 when an object is detected in the activation zone 16. Once the result of detection in the safeguard zone 42 is validated, the validation is maintained for a second time period of Tb. In other words, the result of detection in the safeguard zone 42 is maintained effective for the time period of Tb after the object goes out of the activation zone 16. The time period Tb may be from three (3) to five (5) seconds, for example.

Figure 21:
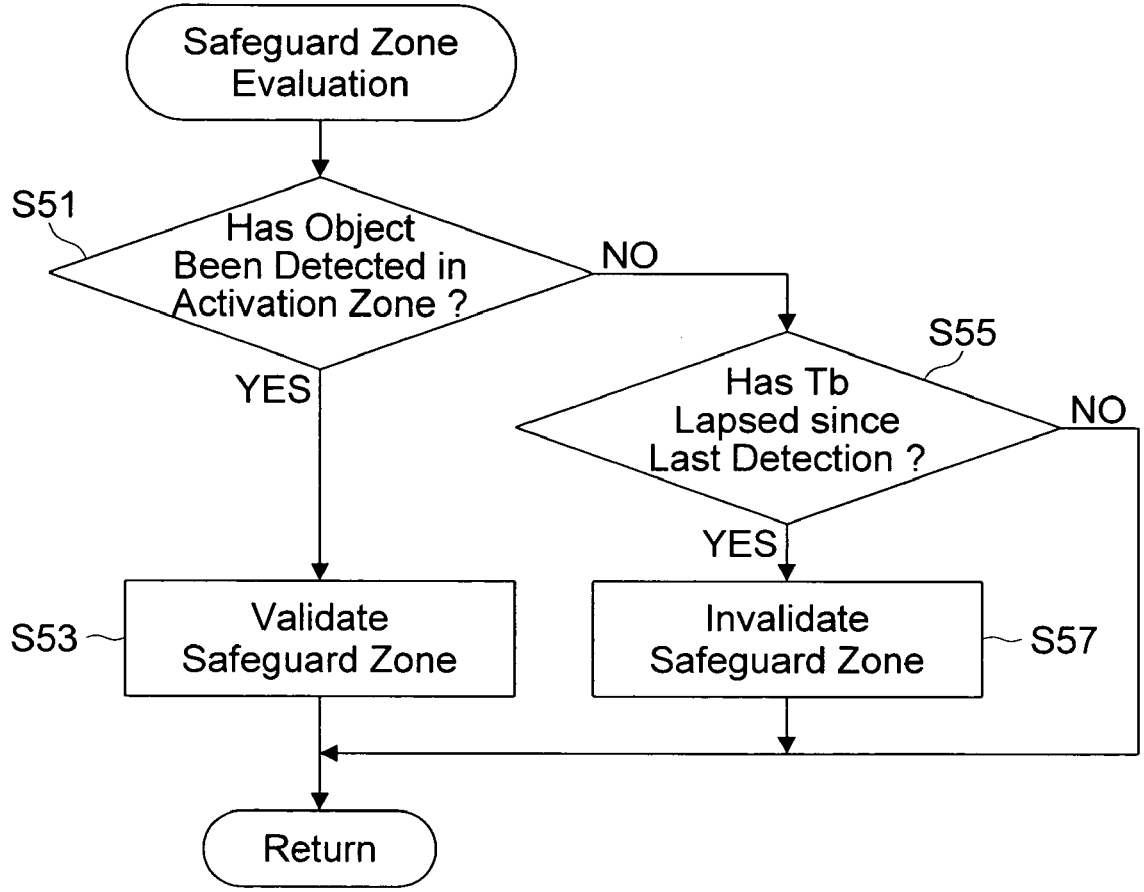
FIG. 21 is a flow chart illustrating the detail of safeguard zone evaluation processing in the composite sensor according to the fifth embodiment of the present invention.

For this purpose, the CPU 50 operates to execute the safeguard zone evaluation processing according to steps illustrated in a flow chart shown in FIG. 21. First, the CPU 50 makes a judgment, in Step S51, as to whether an object has been detected in the activation zone 16. The judgment is made on the basis of the result of detection obtained in Step S3 shown in FIG. 14.

If an object is detected, the CPU 50 advances to Step S53 and validates the result of detection in the safeguard zone 42, and the safeguard zone evaluation processing of FIG. 21 is ended. On the other hand, if no object has been detected in the activation zone 16, the processing advances from Step S51 to Step S55, where a judgment is made as to whether or not the time period Tb has lapsed since the last detection of an object in the activation zone 16.

If it is judged that the time period Tb has already passed, the CPU 50 advances to Step S57, where it invalidates the result of detection in the safeguard zone 42. Then, the safeguard zone evaluation processing is ended. If, on the other hand, it is judged that the time period Tb has not lapsed yet, the safeguard zone evaluation processing is ended.

According to the fifth embodiment, the result of detection in the safeguard zone 42 is validated and the validation is maintained for the time period of Tb when an object is detected in the activation zone 16. In other words, the time period during which the result of detection in the safeguard zone 42 is kept validated is limited. Accordingly, unnecessary validation of the result of detection in the safeguard one 42 can be prevented, which can reduce occurrences of erroneous operation of the automatic door which would be caused by external disturbances, such as raindrops and snowflakes. Since the validation of the result of detection in the safeguard zone 42 is maintained for the period of Tb after a pedestrian goes out of the activation zone 16, the safety of pedestrians can be further enhanced.

Figure 22:
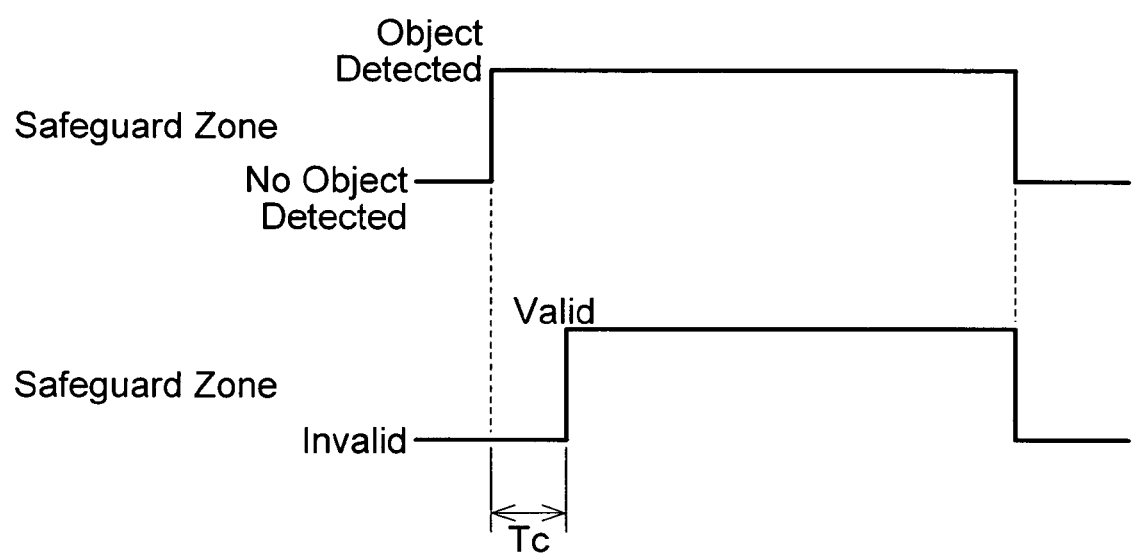
FIG. 22 shows the validation and invalidation of a safeguard zone in relation to the detection of an object in the safeguard zone of a composite sensor according to a sixth embodiment of the present invention.
Figure 23:
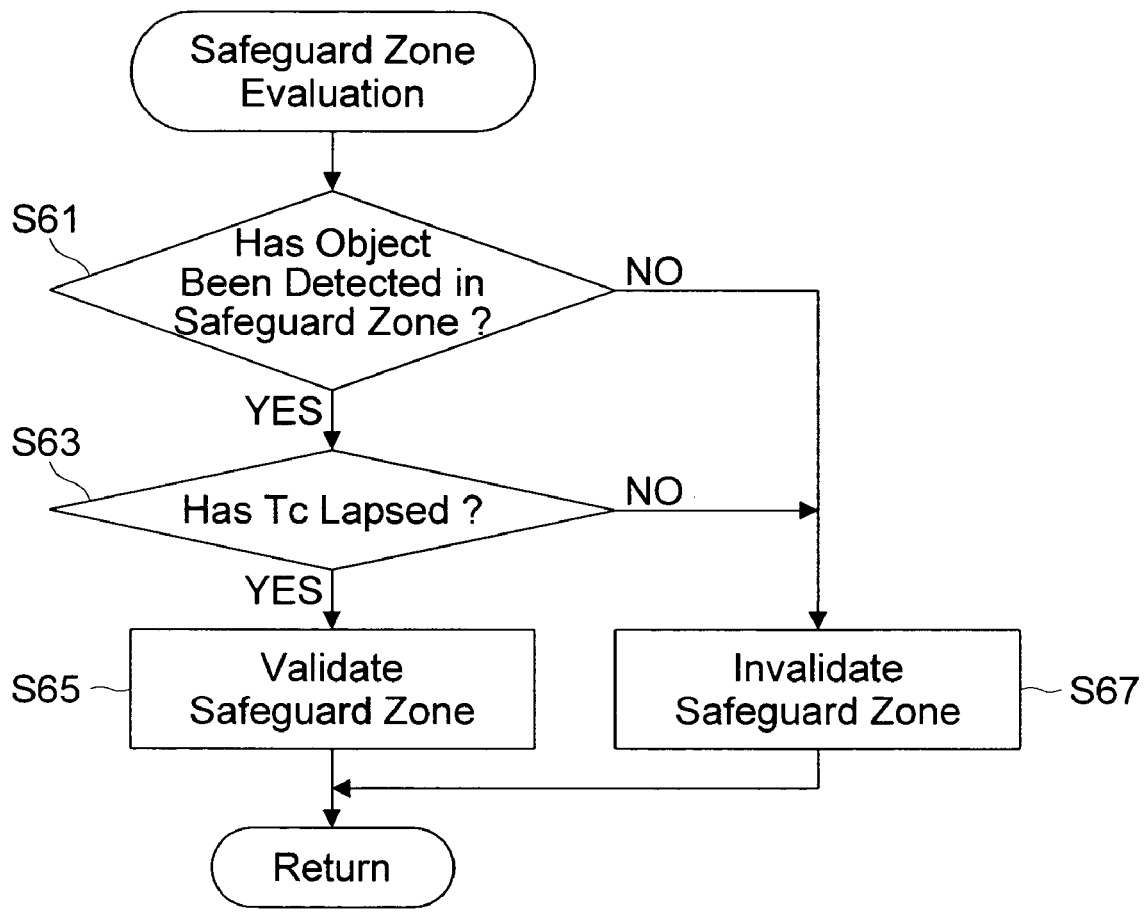
FIG. 23 is a flow chart illustrating the detail of safeguard zone evaluation processing in the composite sensor according to the sixth embodiment of the present invention.

Referring to FIGS. 22 and 23, a composite sensor according to a sixth embodiment is described. The sensor according to the sixth embodiment, too, is the same in hardware as the sensor of the second embodiment, but different only in the safeguard zone evaluation processing.

The CPU 50 of the sensor according to the sixth embodiment validates the result of detection in the safeguard zone 42 only when an object is detected in safeguard zone 42 and keeps being detected for a third time period of Tc, as shown in FIG. 22. The time period Tc may be from 0.3 seconds to one (1) second, for example.

For this purpose, the CPU 50, in the safeguard zone evaluation processing, operates according to a flow chart shown in FIG. 23. First, the CPU 50 makes a judgment, in Step S61, as to whether an object has been detected in the safeguard zone 42. This judgment is done based on the result of the safeguard zone detection done in Step 5 shown in FIG. 14.

If an object is detected in the safeguard zone 42, the CPU 50 executes Step S63 to judge whether the time period Tc has lapsed since the object was detected. If the CPU 50 judges that the time Tc has lapsed, it advances to Step S65 where it validates the result of detection in the safeguard zone 42. Then, the safeguard zone evaluation processing shown in FIG. 23 is ended.

If it is judged, in Step S61, that no object has been detected in the safeguard zone 42, the CPU 50 advances to Step S67. In Step S67, the CPU 50 invalidates the result of detection in the safeguard zone 42 and, then, ends the safeguard zone evaluation processing. If it is judged in Step S63 that the time Tc has not lapsed, the processing advances through Step S67, and the safeguard zone evaluation is ended.

As described, according to the sixth embodiment, only when an object is continuously detected in the safeguard zone 42 for the time Tc, the result of detection in the safeguard zone 42 is validated. Accordingly, even when raindrops and snowflakes are erroneously detected as a pedestrian in the safeguard zone 42, the result of detection is ignored and is not reflected in the sensor output unless they keep being detected for the time Tc, i.e. if such detection is transient. Only an object which keeps being detected in the safeguard zone 42 for the time period of Tc can be judged to be a pedestrian, causing the result of detection in the safeguard zone 42 to be validated. Thus, occurrences of erroneous operation of the door which would be caused by external disturbances, such as rain and snow, can be reduced.

Figure 24:
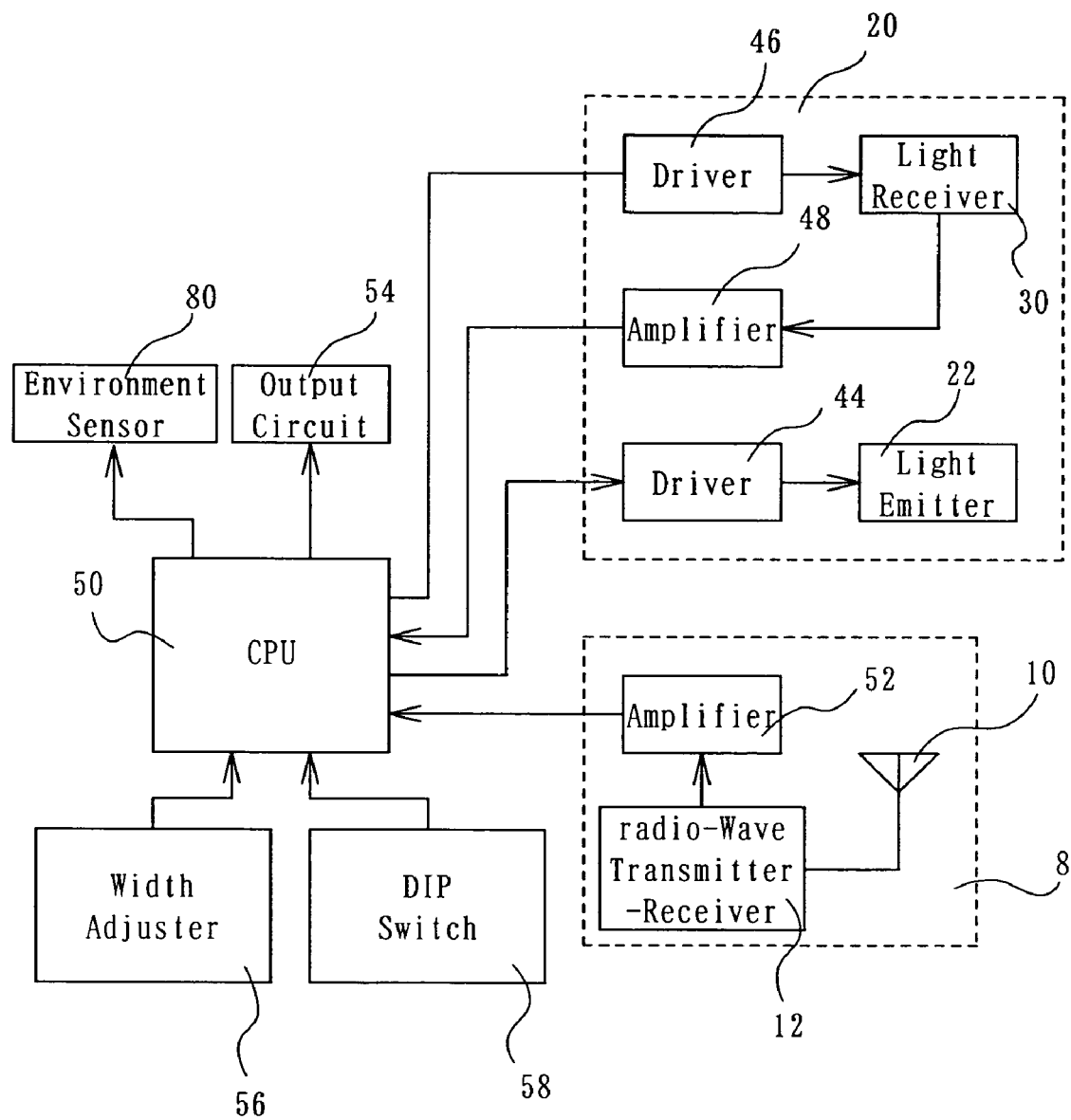
FIG. 24 is a block circuit diagram of a composite sensor for a door according to a seventh embodiment of the present invention.
Figure 25:
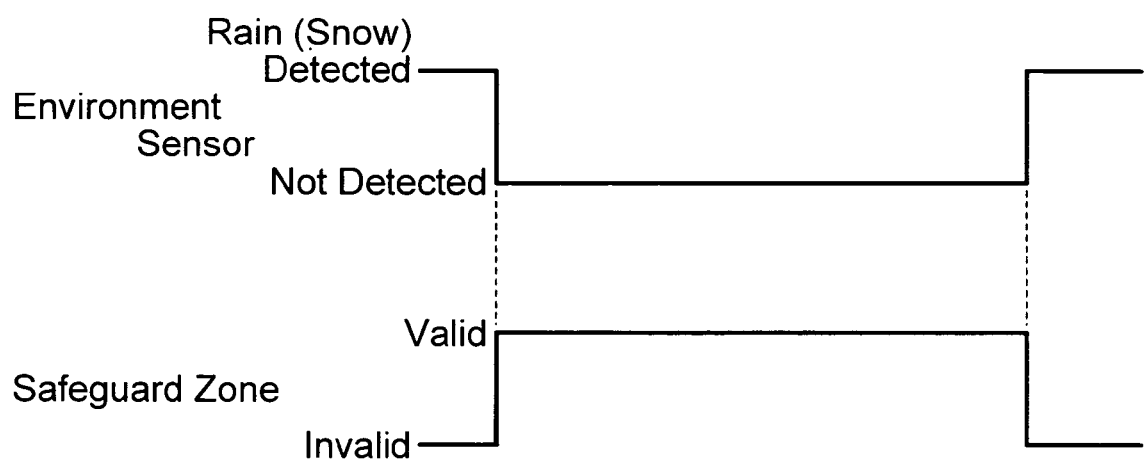
FIG. 25 shows the validation and invalidation of a safeguard zone in relation to an output from an environment sensor section of the composite sensor shown in FIG. 24.

Next, a sensor according to a seventh embodiment is described with reference to FIGS. 24, 25 and 26. The sensor according to the seventh embodiment has the same arrangement as the sensor according to the first embodiment shown in FIG. 12, except that it includes an environment sensor 80 in place of the limit switch 60. The CPU 50 selectively validates and invalidates the result of detection in the safeguard zone 42 according to an output signal of the environment sensor 80. For this reason, the sensor according to the seventh embodiment differs in safeguard zone evaluation processing from that of the sensor according to the second embodiment, but otherwise it is the same as the sensor according to the second embodiment.

The environment sensor 80 is for sensing the environmental condition outside the door 4. For example, it can be used for detecting rainfall and snowfall outside the door 4. Although not shown in detail, it is provided with a temperature sensor and a humidity sensor. The CPU 50 indirectly detects rainfall or snowfall on the basis of outputs from the temperature and humidity sensors, and, in response to these outputs, validates or invalidates the result of detection in the safeguard zone 42.

Specifically, reference values for humidity at different temperatures have been stored in the built-in memory of the CPU 50, and the CPU 50 uses the values in judging whether or not rain or snow is falling. The CPU 50 takes in outputs of the temperature and humidity sensors of the environment sensor 80 to determine the current temperature and humidity outside the door 4, and compares the current humidity with the humidity reference value for the current temperature. The CPU 50 judges that rain or snow is falling if the current humidity is above the humidity reference value, and invalidates the result of detection in the safeguard zone 42 as shown in FIG. 25. If the current humidity is below the reference value of humidity at the current temperature, the CPU 50 judges that no rain or snow is falling, and validates the result of detection in the safeguard zone 42.

Figure 26:
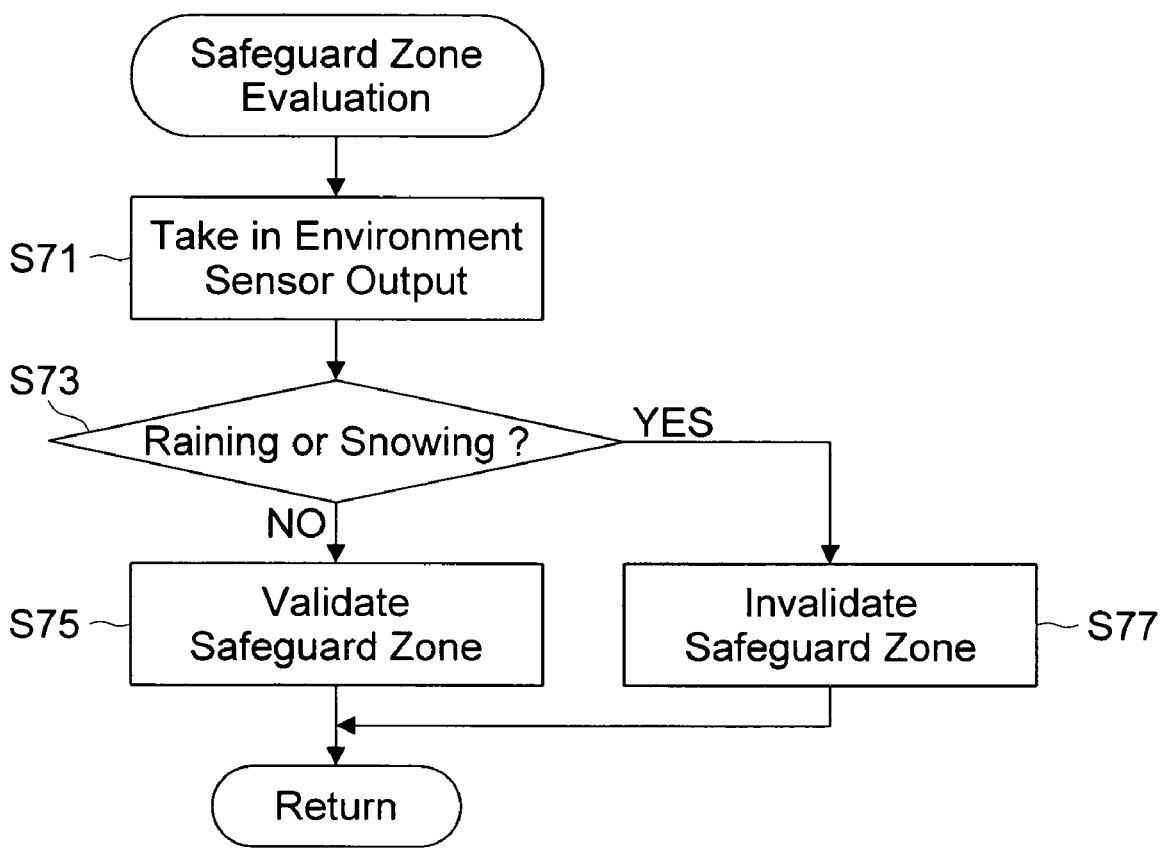
FIG. 26 is a flow chart illustrating the detail of safeguard zone evaluation processing in the composite sensor shown in FIG. 24.

For this purpose, the CPU 50 executes the safeguard zone evaluation processing in the manner as illustrated by the flow chart shown in FIG. 26. In Step S71, the CPU 50 takes in the output of the environment sensor 80, i.e. the outputs of the temperature and humidity sensors of the environment sensor 80, and makes judgment, in Step S73, as to whether or not rain or snow is falling in the above-described manner.

If it is judged that no rain or snow is falling, the CPU 50 advances to Step S75, where it validates the result of detection in the safeguard zone 42, and ends the safeguard zone evaluation processing shown in FIG. 26. On the other hand, if it is judged, in Step S73, that rain or snow is falling, the CPU 50 executes Step S77 to invalidate the result of detection in the safeguard zone 42, and ends the safeguard zone evaluation processing.

According to the seventh embodiment, when rain or snow is falling, the result of detection in the safeguard zone 42 is invalidated and is not reflected in the sensor output. Thus, occurrences of erroneous operation of the door which would be caused by rainfall and snowfall can be reduced.

In place of the environment sensor 80 including temperature and humidity sensors, a sensor for detecting water on the floor 14, for example, may be used to judge whether rain or snow is falling. Also, brightness outside the door in the daytime may be used to judge whether the weather is fine or cloudy, and the judgment may be taken into account when judgment is made as to whether rain or snow is falling. This makes increases the reliability of judgment of rainfall or snowfall. In addition, by taking into account, seasons, for example, the rainy season in June or July or snowy winter, the judgment may be made more reliably.

The composite sensor has been described as being mounted on a double sliding door, but the sensor may be used with a single sliding door, a swing door and a revolving door.

It should be also noted that the second through seventh embodiments may be combined in any manner. For example, the safeguard zone 42 may be selectively validated and invalidated based on both the output of the limit switch 60 and the result of detection in the activation zone 16.

What is claimed is:

1. A composite sensor for a door, comprising:
    a radio-wave transmitter-receiver section for forming a radio-wave detection zone for detecting an object at a location remote from said door; and
    a light emitter-receiver section for forming an optical detection zone for detecting an object at a location along and closer to said door;
    said light emitter-receiver section including optical detection zone modifying means which fixes the position of an edge closer to said door of said optical detection zone and moves an edge remote from said door of said optical detection zone in a direction perpendicular to said door to thereby increase or decrease a dimension of said optical detection zone in the direction perpendicular to said door.

2. The composite sensor according to claim 1 wherein said light emitter-receiver section comprises a light emitter and a light receiver; and said optical detection zone modifying means comprises reflecting means for said light emitter for reflecting light beams from said light emitter, reflecting means for said light receiver for reflecting light beams toward said light receiver, light-collecting means for said light emitter for collecting light beams from said light emitter, and light-collecting means for said light receiver for collecting light beams toward said light receiver; said reflecting means for said light emitter, said reflecting means for said light receiver, said light-collecting means for said light emitter and said light-collecting means for said light receiver being united together; said reflecting means for said light emitter, said reflecting means for said light receiver, said light-collecting means for said light emitter and said light-collecting means for said light receiver being synchronously rotated to increase or decrease the dimension of said optical detection zone in the direction perpendicular to said door.

3. A composite sensor for a door for forming a first detection zone for detecting an object with a radio wave at a location remote from said door, and a second detection zone for detecting an object with light beams at a location along and closer to said door;
    first judging means judging whether an object has been detected in said first detection zone;
    second judging means judging whether an object has been detected in said second detection zone;
    third judging means judging whether the judgment made by said second judging means is valid; and
    fourth judging means judging whether an object is present in accordance with the judgments made by said first and second judging means when said third judging means judges that the judgment made by said second judging means is valid, and judging whether an object is present in accordance with the judgment made by said first judging means when said third judging means judges that the judgment made by said second judging means is invalid.

4. The composite sensor according to claim 3 wherein said third judging means judges that the judgment made by said second judging means is valid when an object is detected in said first detection zone continuously for a first time period.

5. The composite sensor according to claim 3 wherein said third judging means judges that the judgment made by said second judging means is valid for a selected time period after an object is detected in said first detection zone.

6. The composite sensor according to claim 3 wherein said third judging means judges that the judgment made by said second judging means is valid when an object is detected continuously for a time period in said second detection zone.

7. The composite sensor according to claim 3 wherein said third judgment means judges that the judgment made by said second judging means is valid when an object is detected in said first detection zone.

8. A composite sensor for a door for forming a first detection zone for detecting an object with a radio wave at a location remote from said door, and a second detection zone for detecting an object with light beams at a location along and closer to said door;

said composite sensor including an environmental condition sensor for detecting an environmental condition around said door, and invalidating means for making a result of detection in said second detection zone invalid when an environmental condition detection made by said environmental condition sensor is judged to affect said result of detection in said second detection zone.

* * * * *